United States Patent
Edge et al.

(10) Patent No.: US 10,952,028 B2
(45) Date of Patent: Mar. 16, 2021

(54) LOCATION OF A MOBILE DEVICE WITH WIRELESS ACCESS USING A USER PLANE LOCATION SOLUTION

(71) Applicant: QUALCOMM Incorporated, San Diego, CA (US)

(72) Inventors: Stephen William Edge, Escondido, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/373,120

(22) Filed: Apr. 2, 2019

(65) Prior Publication Data

US 2019/0357011 A1    Nov. 21, 2019

Related U.S. Application Data

(60) Provisional application No. 62/672,568, filed on May 16, 2018.

(51) Int. Cl.
*H04W 4/029*  (2018.01)
*H04W 4/02*   (2018.01)
(Continued)

(52) U.S. Cl.
CPC .......... *H04W 4/029* (2018.02); *H04W 4/025* (2013.01); *H04W 4/80* (2018.02); *H04W 24/10* (2013.01);
(Continued)

(58) Field of Classification Search
CPC ..... H04W 24/10; H04W 4/025; H04W 4/029; H04W 4/80; H04W 64/003;
(Continued)

(56) References Cited

U.S. PATENT DOCUMENTS

| | | | |
|---|---|---|---|
| 2010/0035634 A1* | 2/2010 | Shim | H04W 4/029 455/456.1 |
| 2011/0039578 A1* | 2/2011 | Rowitch | G01S 5/0236 455/456.1 |

(Continued)

OTHER PUBLICATIONS

International Search Report and Written Opinion—PCT/US2019/025578—ISA/EPO—dated Jun. 17, 2019.

*Primary Examiner* — Kevin C. Harper
*Assistant Examiner* — Derrick V Rose

(57) ABSTRACT

Techniques are discussed herein for supporting location of a user equipment (UE) with wireless access using a user plane (UP) location solution like SUPL. To locate the UE, an initial UP location session is established between the UE and a location server (LS) during which the LS requests location measurements from the UE. The UE obtains the location measurements by ending the location session and entering an idle state, after indicating this intent to the LS. The UE sends the location measurements to the LS by reentering a connected state and starting a new UP location session with the LS, which may be associated with the initial location session using common identification information. The techniques may be used for a UE with only a single RF chain (e.g. a UE that supports NB-IoT or other narrowband wireless access).

30 Claims, 10 Drawing Sheets

(51) Int. Cl.
*H04W 4/80* (2018.01)
*H04W 64/00* (2009.01)
*H04W 68/00* (2009.01)
*H04W 24/10* (2009.01)
*H04W 80/10* (2009.01)

(52) U.S. Cl.
CPC ....... *H04W 64/003* (2013.01); *H04W 68/005* (2013.01); *H04W 80/10* (2013.01)

(58) Field of Classification Search
CPC ..... H04W 68/005; H04W 80/10; H04W 4/02; H04W 4/20; H04W 4/70; H04W 68/00; H04W 76/27; H04L 67/145
See application file for complete search history.

(56) References Cited

U.S. PATENT DOCUMENTS

| | | |
|---|---|---|
| 2016/0014639 A1 | 1/2016 | Edge et al. |
| 2018/0054795 A1 | 2/2018 | Edge |
| 2019/0349881 A1* | 11/2019 | Choi ...................... H04W 4/00 |

* cited by examiner

LOCATION OF A MOBILE DEVICE WITH WIRELESS ACCESS USING A USER PLANE LOCATION SOLUTION

CROSS-REFERENCE TO RELATED APPLICATIONS

This application claims the benefit of U.S. Provisional Application No. 62/672,568, entitled "SYSTEMS AND METHODS FOR SUPPORT OF LOCATION FOR NB-IOT UEs USING SUPL," filed May 16, 2018, which is assigned to the assignee hereof and which is expressly incorporated herein by reference in its entirety.

BACKGROUND

Field

Subject matter disclosed herein relates to estimation of a location of a mobile device and more particularly to location of a mobile device that connects to a wireless network with user plane location services.

Information

The location of a mobile device, such as a cellular telephone, may be useful or essential to a number of applications including emergency calls, navigation, direction finding, asset tracking and Internet service. The location of a mobile device may be estimated based on information gathered from various systems and using different location solutions. One location solution, which has been defined by the Open Mobile Alliance (OMA), is known as Secure User Plane Location (SUPL) and employs signaling, conveyed at a user plane level, between a mobile device and a location server to coordinate the location of the mobile device. For a mobile device supporting Narrow Band Internet of Things (NB-IoT) wireless access, the mobile device may have only one radio receiver (RF chain) to reduce cost and power (e.g., battery) usage. This may prevent the mobile device from obtaining certain location measurements (e.g. GNSS or WLAN location measurements) while interacting with a SUPL location server, since the single RF chain may need to be dedicated to either signaling or location measurements but not to both at the same time. This conflict could interfere with mobile device location using SUPL and potentially could prevent location of the mobile device. It may thus be an advantage to develop techniques capable of better supporting location of a mobile device with NB-IoT access using SUPL.

SUMMARY

In one aspect, a method for supporting location services for a user equipment (UE) performed by the UE, includes beginning a first user plane location session with a location server; receiving a request for location measurements from the location server; sending an indication to the location server that the UE will enter an idle state in which the UE will not be connected with a wireless network; ending the first user plane location session with the location server; entering the idle state; obtaining the location measurements while in the idle state; re-entering a connected state with the wireless network; beginning a second user plane location session with the location server; and sending the location measurements to the location server using the second user plane location session.

In one aspect, a user equipment (UE) capable of supporting location services, includes at least one wireless transceiver configured to wirelessly communicate with a wireless network; and at least one processor coupled to the at least one wireless transceiver and configured to begin via the at least one wireless transceiver a first user plane location session with a location server; receive via the at least one wireless transceiver a request for location measurements from the location server, send via the at least one wireless transceiver an indication to the location server that the UE will enter an idle state in which the UE will not be connected with the wireless network, end via the at least one wireless transceiver the first user plane location session with the location server, enter the idle state, obtain via the at least one wireless transceiver the location measurements while in the idle state, re-enter a connected state with the wireless network, begin via the at least one wireless transceiver a second user plane location session with the location server, and send via the at least one wireless transceiver the location measurements to the location server using the second user plane location session.

In one aspect, a user equipment (UE) capable of supporting location services, includes means for beginning a first user plane location session with a location server; means for receiving a request for location measurements from the location server; means for sending an indication to the location server that the UE will enter an idle state in which the UE will not be connected with a wireless network; means for ending the first user plane location session with the location server; means for entering the idle state; means for obtaining the location measurements while in the idle state; means for re-entering a connected state with the wireless network; means for beginning a second user plane location session with the location server; and means for sending the location measurements to the location server using the second user plane location session.

In one aspect, a non-transitory storage medium including program code stored thereon, the program code is operable to cause at least one processor in a user equipment (UE) capable of supporting location services to: begin a first user plane location session with a location server; receive a request for location measurements from the location server; send an indication to the location server that the UE will enter an idle state in which the UE will not be connected with a wireless network; end the first user plane location session with the location server; enter the idle state; obtain the location measurements while in the idle state; re-enter a connected state with the wireless network; begin a second user plane location session with the location server; and send the location measurements to the location server using the second user plane location session.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
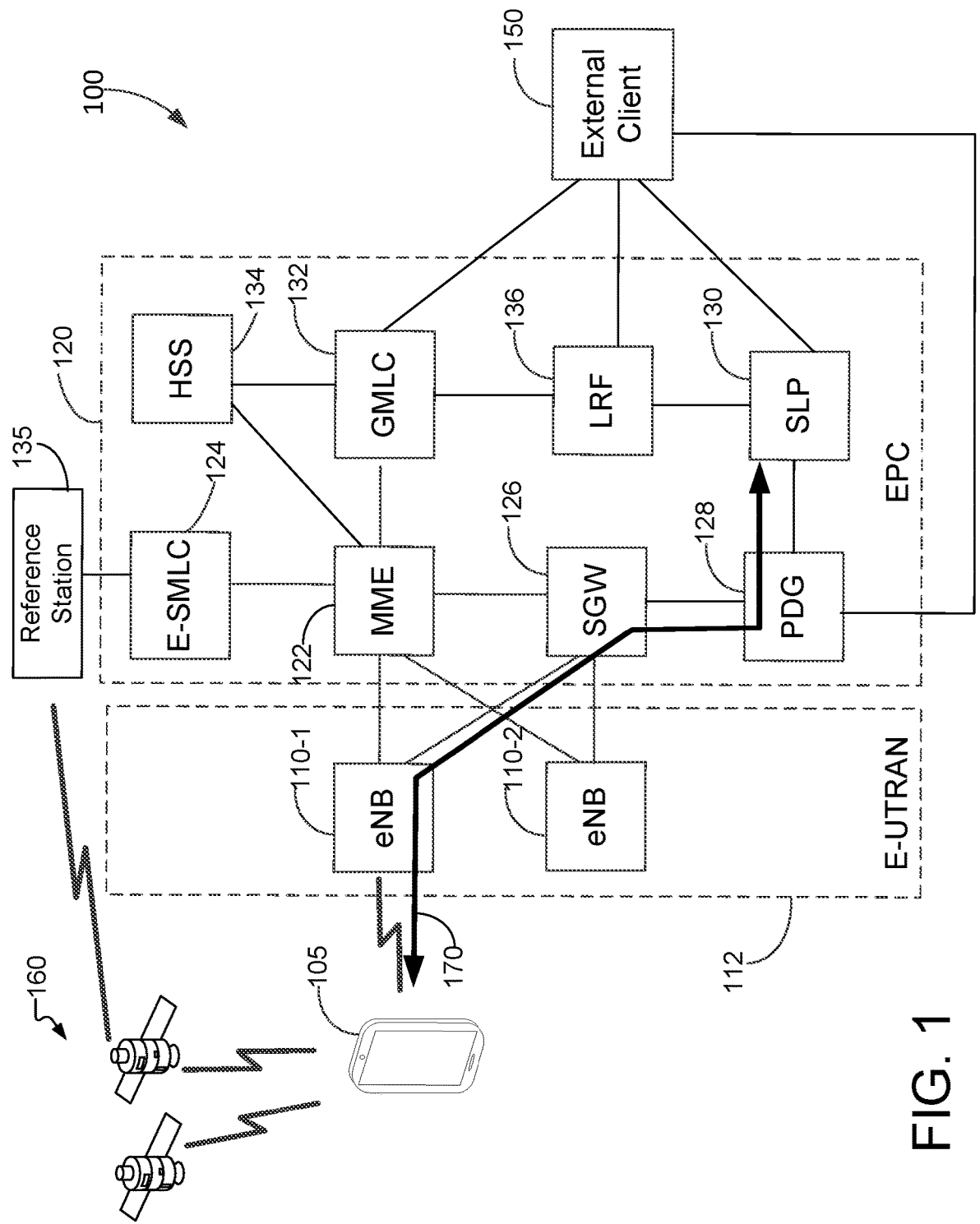
FIG. 1 is a system diagram illustrating certain features of a Fourth Generation (4G) communication system comprising a mobile device and a cellular network, in accordance with an example implementation.

Reference is made in the following detailed description to the above accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 210 may be indicated as 210-1, 210-2, 210-3 etc. When referring to such an element using only the first number, any instance of the element is to be understood (e.g. element 210 in the previous example would refer any of the elements 210-1, 210-2 and 210-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G), Fourth Generation (4G) Long Term Evolution (LTE), and Fifth Generation (5G) New Radio (NR). These solutions are defined in 3GPP Technical Specifications (TSs) 23.271 (common part for 2G-4G), 43.059 (GSM access), 25.305 (UMTS access), 36.305 (LTE access), and 23.501 and 23.502 (5G access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a user equipment (UE) or may simply be accessible over the Internet or over a local Intranet. If positioning of a UE is needed, an LS may initiate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the Assisted Global Navigation Satellite System (A-GNSS), Observed Time Difference of Arrival (OTDOA) and/or Enhanced Cell ID (ECID) position methods. Assistance data may be used by a UE to help acquire and measure signals, such as GNSS signals for A-GNSS and/or a Positioning Reference Signal (PRS) for OTDOA (e.g. by providing expected characteristics of these signals such as frequency, bandwidth, expected time of arrival, signal coding, signal Doppler).

In a UE based mode of operation, assistance data may also or instead be used by a UE to help determine a location estimate for the UE from the resulting location measurements (e.g., if the assistance data provides satellite ephemeris data in the case of A-GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and possibly based also on other known or configured data (e.g. satellite ephemeris data for A-GNSS location or base station characteristics including base station locations and possibly PRS timing in the case of terrestrial positioning using OTDOA).

In another standalone mode of operation, a UE may make location related measurements without any positioning assistance data from an LS and may further compute a location or a change in location without any positioning assistance data from an LS. Position methods that may be used in a standalone mode include GPS and Global Navigation Satellite System (GNSS) (e.g. if a UE obtains satellite orbital data from navigation data broadcast by GPS and GNSS satellites themselves) as well as sensors. It is noted that the terms "positioning assistance data", "location assistance data" and "assistance data" (AD) are used synonymously herein to refer to data which may be provided to a mobile device via broadcast or by point to point means to assist the mobile device to obtain location measurements (also referred to as positioning measurements) and/or to compute a location estimate from positioning measurements.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G (e.g. NR) access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call initiated by the UE; or (iv) a visited SLP (V-SLP) if in or associated with a serving network or a current local area for a UE.

During a location session (also referred to as a positioning session), an LS and a UE may exchange messages defined according to some positioning protocol in order to coordinate the determination of an estimated location for the UE. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains an embedded LPPe message. The combined LPP and LPPe protocols may be referred to as LPP/LPPe. LPP and LPP/LPPe may be used to help support the 3GPP control plane location solution for LTE access, in which case LPP or LPP/LPPe messages are exchanged between a UE and E-SMLC. LPP or LPP/LPPe messages may be exchanged between a UE and E-SMLC via a serving Mobility Management Entity (MME) and a serving eNodeB for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages, such as a SUPL POS or SUPL POS INIT message, which may be conveyed using TCP and IP protocols.

An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC.

To support low cost UEs and particularly Internet of Things (IoT) UEs, 3GPP has defined a variant of LTE, referred to as Narrow Band Internet of Things (NB-IoT), which provides a UE with access to a single LTE resource block, comprising 200 KHz total bandwidth and 180 KHz of usable bandwidth, for signaling and data use. Support and usage of NB-IoT is intended mainly for UEs which are not associated with a human user, but instead are used for such applications as telemetry, asset tracking (and child and pet tracking), utility meter reporting, vending machines, safety and security monitoring etc. and which are typically part of IoT. Such UEs may often be low cost and can be powered by (e.g. non-rechargeable) batteries with an expected lifetime of up to ten years. As a consequence, it may be desirable or necessary to employ minimal hardware capability and consume minimal power, which may lead to many or most such UEs having only one radio receiver (RF chain). Consequently, such a UE may not be able to obtain location measurements for non-NB-IoT radio signals such as GNSS or Wireless Local Area Network (WLAN) signals when in an NB-IoT connected state, and measurements of NB-IoT radio signals may also be problematic, due to dedication of the single RF chain only to signaling and data transfer with a wireless (NB-IoT) network.

To enable location measurements by a UE with only one RF chain, the UE may enter an idle state to obtain the location measurements, after which the UE may re-enter a connected state and send the measurements to the location server. For an SLP location server, using the SUPL user plane location solution, however, the SLP may not be aware that the UE has NB-IoT access, which may lead to communication problems between the UE and SLP while the UE is in an idle state. For example, the SLP may send a request to the UE for additional location measurements or for the location capabilities of the UE and may expect a response from the UE within some limited time (e.g. 20 seconds or less), or at least may expect an acknowledgment of the request (e.g., at the TCP level) from the UE. The lack of a response or lack of an acknowledgment from the UE within some minimum time (e.g., 20 seconds or less) may cause the SLP to abort the location session in some implementations. In other implementations, the entry into an idle state by the UE may cause a TCP connection between the UE and SLP to disconnect due to lack of responses to TCP keep alive messages and failure of TCP retransmission. This could lead to a failure to locate the UE.

A solution to the above-identified problem for SUPL may include, e.g., providing an indication from the UE to the SLP that the UE is about to enter an idle state in order to obtain requested location measurements. The SUPL location session may then be released, e.g., by the SLP or the UE. After the UE obtains the location measurements while in the idle state, the UE may reconnect to the SLP and a new SUPL location session may be initiated (e.g. by the UE or by the SLP), in which the UE may provide the requested location measurements to the SLP. The new SUPL location session, for example, may be a copy of the first SUPL location session, e.g., using the same identification information, to avoid accidental association with some other non-related SUPL session.

FIG. 1 is a diagram illustrating a communication system 100 for location support of a user equipment (UE) 105 that supports and is currently using LTE radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 105, an Evolved Universal Mobile Telecommunications Service (UMTS) Terrestrial Radio Access (E-UTRA) Network (E-UTRAN) 112, and an Evolved Packet Core (EPC) 120. The E-UTRAN 112 and the EPC 120 may be part of a Visited Public Land Mobile Network (VPLMN) that is a serving network for the UE 105 and communicates with a Home Public Land Mobile Network (HPLMN) for the UE 105 (not shown in FIG. 1) or may be part of the HPLMN for UE 105. The E-UTRAN 112 and EPC 120 may interconnect with other networks. For example, the Internet may be used to carry messages to and from different networks or between different entities within a network, such as between the Packet Data Network Gateway (PDG) 128 that may be connected to the Serving Gateway (SGW) 126. For simplicity these networks and associated entities and interfaces are not shown. As shown, the communication system 100 provides packet-switched services to the UE 105. However, as those skilled in the art will readily appreciate, the various concepts presented throughout this disclosure may be extended to networks providing circuit-switched services.

The UE 105 may comprise any electronic device configured for NB-IoT and/or LTE radio access, for example. The UE 105 may be referred to as a device, a wireless device, a mobile terminal, a terminal, a mobile station (MS), a mobile device, a SUPL Enabled Terminal (SET), or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 105 may comprise a single entity or may comprise multiple entities such as in a personal area network where a user may employ audio, video and/or data I/O devices and/or body sensors and a separate wireline or wireless modem. Typically, though not necessarily, a UE 105 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G New Radio (NR), WiMax, etc. EPC 120 combined with E-UTRAN 112 may be an example of a WWAN. A UE 105 may also support wireless communication with one or more types of Wireless Local Area Network (WLAN) such as a WLAN supporting IEEE 802.11 WiFi (also referred to as Wi-Fi) or Bluetooth® (BT). UE 105 may also support communication with one or more types of wireline network such as by using a Digital Subscriber Line (DSL) or packet cable for example. Although FIG. 1 shows only one UE 105, there may be many other UEs (e.g. hundreds, thousands or millions) that can each correspond to UE 105. Typically, the UE 105 has a single radio receiver (RF chain) which prevents or impedes location measurements by the UE 105 when in a connected state with the EPS in communication system 100.

The UE 105 may enter a connected state with a wireless communication network that may include the E-UTRAN 112 and EPC 120. In one example, UE 105 may communicate with a cellular communication network by transmitting wireless signals to, and/or receiving wireless signals from, a cellular transceiver, such as an evolved Node B (eNodeB or eNB) 110-1 in the E-UTRAN 112. The E-UTRAN 112 may include one or more additional eNBs 110-2. The eNB 110-1 provides user plane and control plane protocol terminations toward the UE 105. The eNB 110-1 may comprise a serving eNB for UE 105 and may also be referred to as a base station, a base transceiver station, a radio base station, a radio transceiver, a radio network controller, a transceiver function, a base station subsystem (BSS), an extended service set (ESS), or by some other suitable terminology. The UE 105 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and 5G NR. NB-IoT, GSM, WCDMA, LTE, eMTC and NR are technologies defined by 3GPP. CDMA and HRPD are technologies defined by the 3rd Generation Partnership Project 2 (3GPP2). Cellular transceivers, such as eNBs 110-1 and 110-2, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 110-1 and 110-2 may be connected by an interface (e.g. the 3GPP Si interface) to the EPC 120. The EPC 120 includes a Mobility Management Entity (MME) 122, and a Serving Gateway (SGW) 126 through which data (e.g. Internet Protocol (IP) packets) to and from the UE 105 may be transferred. The MME 122 may be the serving MME for UE 105 and is then the control node that processes the signaling between the UE 105 and the EPC 120 and supports attachment and network connection of UE 105, mobility of UE 105 (e.g. via handover between network cells) as well as establishing and releasing data bearers on behalf of the UE 105. Generally, the MME 122 provides bearer and connection management for the UE 105 and may be connected to the SGW 126, the eNBs 110-1 and 110-2, an Enhanced Serving Mobile Location Center (E-SMLC) 124 and a Gateway Mobile Location Center (GMLC) 132 in the EPC 120.

The E-SMLC 124 may support location of the UE 105 using the 3GPP control plane (CP) location solution defined in 3GPP technical specifications (TSs) 23.271 and 36.305.

The GMLC 132 may provide access on behalf of an external client (e.g. external client 150) or another network (e.g. HPLMN) to the location of UE 105. The external client 150 may comprise a web server or remote application that may have some association with UE 105 (e.g. may be accessed by a user of UE 105 via E-UTRAN 112 and EPC 120) or may be a server, application or computer system providing a location service to some other user or users which may include obtaining and providing the location of UE 105 (e.g. to enable a service such as friend or relative finder, asset tracking or child or pet location). The external client 150 may be referred to as a SUPL Agent 150 when accessing an SLP such as SLP 130.

E-SMLC 124 may be connected to or have access to one or more reference stations 135 which may be part of EPC 120 or separate from EPC 120 (e.g. part of a GNSS reference network and owned and operated by a service provider different to the operator of EPC 120). A reference station 135 may comprise or include a GNSS receiver configured to acquire, measure and decode signals transmitted by one or more GNSSs. A reference station 135 may be configured to obtain or determine orbital and timing data for Satellite Vehicles (SVs) 160 for one or more GNSSs and infer information for environmental factors that can affect GNSS location such as ionospheric and tropospheric delay. A reference station 135 may transfer determined information to E-SMLC 124—e.g. periodically or whenever the determined information changes.

As illustrated, the EPC 120 includes a Packet Data Network Gateway (PDG) 128 that may be connected to the SGW 126 (e.g. via the Internet, directly or through a local intranet). The PDG 128 may provide UE 105 with Internet Protocol (IP) address allocation and IP and other data access to external networks (e.g. the Internet) and to external clients (e.g. external client 150) and external servers, as well as other data transfer related functions. In some cases, PDG 128 may be located in an HPLMN and not in EPC 120 when the UE 105 is roaming and receives local IP breakout. The PDG 128 may be connected to a location server, such as SLP 130. The SLP 130 may support the SUPL UP location solution defined by OMA and may support location services for UE 105 based on subscription information for UE 105 stored in SLP 130. In some embodiments of communication system 100, SLP 130 may function as a Home SLP (H-SLP) for UE 105, a Discovered SLP (D-SLP) and/or as an Emergency SLP (E-SLP).

To support a SUPL location session (also referred to as a SUPL session, a SUPL positioning session or a location session) between UE 105 and SLP 130 in communication system 100, the UE 105 and SLP 130 may exchange SUPL messages at a user plane level using IP and TCP (or possibly UDP for an initial SUPL INIT message) as transport protocols. FIG. 1 shows a typical path 170 for a SUPL message, which comprises routing the SUPL message through eNB 110-1, SGW 126 and PDG 128, in this order for a SUPL message sent from UE 105 to SLP 130 or in the reverse order for a SUPL message sent from SLP 130 to UE 105. For example, in the signaling flows described later for FIGS. 3-6, each of the SUPL messages shown as being transferred between the UE 105 and SLP 130 may be transferred via routing along the path 170, when the signaling flows are supported by communication system 100.

The GMLC 132 may be connected to a Home Subscriber Server (HSS) 134 for UE 105, which is a central database that contains user-related and subscription-related information for UE 105. The GMLC 132 may provide location access to the UE 105 on behalf of external clients such as external client 150. The EPC 120 may further include a Location Retrieval Function (LRF) 136 that may be connected to the GMLC 132 and/or to the SLP 130, as defined in 3GPP Technical Specifications (TSs) 23.271 and 23.167. LRF 136 may perform the same or similar functions to GMLC 132, with respect to receiving and responding to a location request from an external client 150 that corresponds to a Public Safety Answering Point (PSAP) supporting an emergency call from UE 105. One or more of the GMLC 132, PDG 128, LRF 136, and SLP 130 may be connected to the external client 150, e.g., through another network, such as the Internet. In some cases, a Requesting GMLC (RGMLC) located in another PLMN (not shown in FIG. 1) may be connected to GMLC 132 (e.g. via the Internet) and/or to the SLP 130 in order to provide location access to UE 105 on behalf of external clients connected to the RGMLC. The GMLC 132 may support location access to the UE 105 using the 3GPP CP solution defined in 3GPP TS 23.271.

It should be understood that while a single network (comprising E-UTRAN 112 and EPC 120) is illustrated in FIG. 1, a separate HPLMN may be present, which may include a separate GMLC (e.g., an H-GMLC) and may include the SLP 130 (e.g. connected to a PDG in the HPLMN, where the PDG may be connected to the SGW 126 in EPC 120).

In particular implementations, the UE 105 may have circuitry and processing resources capable of obtaining location related measurements (also referred to as location measurements), such as measurements for signals received from GPS or other Satellite Positioning System (SPS) SVs 160, measurements for cellular transceivers such as eNBs 110-1 and 110-2, and/or measurements for local transceivers. UE 105 may further have circuitry and processing resources capable of computing a position fix or estimated location of UE 105 based on these location related measurements. In some implementations, location related measurements obtained by UE 105 may be transferred to a location server, such as the E-SMLC 124, or SLP 130, after which the location server may estimate or determine a location for UE 105 based on the measurements.

Location related measurements obtained by UE 105 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 110-1, eNB 110-2 or other local transceivers). UE 105 or a separate location server (e.g. E-SMLC 124 or SLP 130) may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi (also referred to as WLAN positioning), or combinations thereof. In some of these techniques (e.g. A-GNSS, AFLT and OTDOA), pseudoranges, code phases, carrier phases or timing differences may be measured by UE 105 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 105. Here, location servers, such as E-SMLC 124 or SLP 130, may be capable of providing positioning assistance data to UE 105 including, for example, information regarding signals to be measured by UE 105 (e.g., expected signal timing, signal coding, signal frequencies, signal Doppler), locations and/or identities of terrestrial transmitters, and/or signal, timing and orbital information for GNSS SVs 160 to facilitate positioning techniques such as A-GNSS, AFLT, OTDOA and ECID. The facilitation may include improving signal acquisition and measurement accuracy by UE 105 and/or, in some cases, enabling UE 105 to compute its estimated location based on the location measurements. For example, a location server may comprise an almanac (e.g., a Base Station Almanac (BSA)) which indicates the locations and identities of cellular transceivers and transmitters (e.g. eNBs 110-1 and 110-2) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 105 may obtain measurements of signal strength (e.g. received signal strength indication (RSSI) or reference signal received power (RSRP)) for signals received from cellular transceivers (e.g., eNBs 110-1, 110-2) and/or local transceivers and/or may obtain a signal to noise ratio (S/N), a reference signal received quality (RSRQ), or a round trip signal propagation time (RTT) between UE 105 and a cellular transceiver (e.g., eNB 110-1 or 110-2) or a local transceiver. A UE 105 may transfer these measurements to a location server, such as E-SMLC 124 or SLP 130, to determine a location for UE 105, or in some implementations, UE 105 may use these measurements together with positioning assistance data (e.g. terrestrial almanac data or GNSS SV data such as GNSS Almanac and/or GNSS Ephemeris information) received from the location server to determine a location for UE 105.

In the case of OTDOA, UE 105 may measure a Reference Signal Time Difference (RSTD) between signals, such as a Position Reference Signal (PRS) or Cell Specific Reference Signal (CRS), received from nearby transceivers or base stations (e.g. eNBs 110-1 and 110-2). An RSTD measurement may provide the time of arrival difference between signals (e.g. CRS or PRS) received at UE 105 from two different transceivers (e.g. an RSTD between signals received from eNB 110-1 and from eNB 110-2). The UE 105 may return the measured RSTDs to a location server (e.g. E-SMLC 124 or SLP 130), which may compute an estimated location for UE 105 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 105 may be referred to as a location, location estimate, location fix, fix, position, position estimate or position fix, and may be geodetic, thereby providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of a UE 105 may also include an uncertainty and may then be expressed as an area or volume (defined either geodetically or in civic form) within which the UE 105 is expected to be located with some given or default probability or confidence level (e.g., 67% or 95%). A location of a UE 105 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location or some previous location of UE 105. In the description contained herein, the use of the term location may comprise any of these variants unless indicated otherwise. Measurements (e.g. obtained by UE 105 or by another entity such as eNB 110-1) that are used to determine (e.g. calculate) a location estimate for UE 105 may be referred to as measurements, location measurements, location related measurements, positioning measurements or position measurements and the act of determining a location for the UE 105 may be referred to as positioning of the UE 105 or locating the UE 105.

According to an embodiment, communication system 100 may be configured to deliver positioning assistance data in downlink broadcast messages to UE devices such as UE 105. For example, positioning assistance data may be broadcasted in system information blocks (SIBs) in downlink messages from eNB devices 110-1 and 110-2. Furthermore, positioning assistance data that is broadcasted in the SIBs may be key encrypted (also referred to as being ciphered). UE 105 may receive one or more cipher keys in messages other than the broadcast messages for use in decrypting the broadcasted positioning assistance data.

Figure 2:
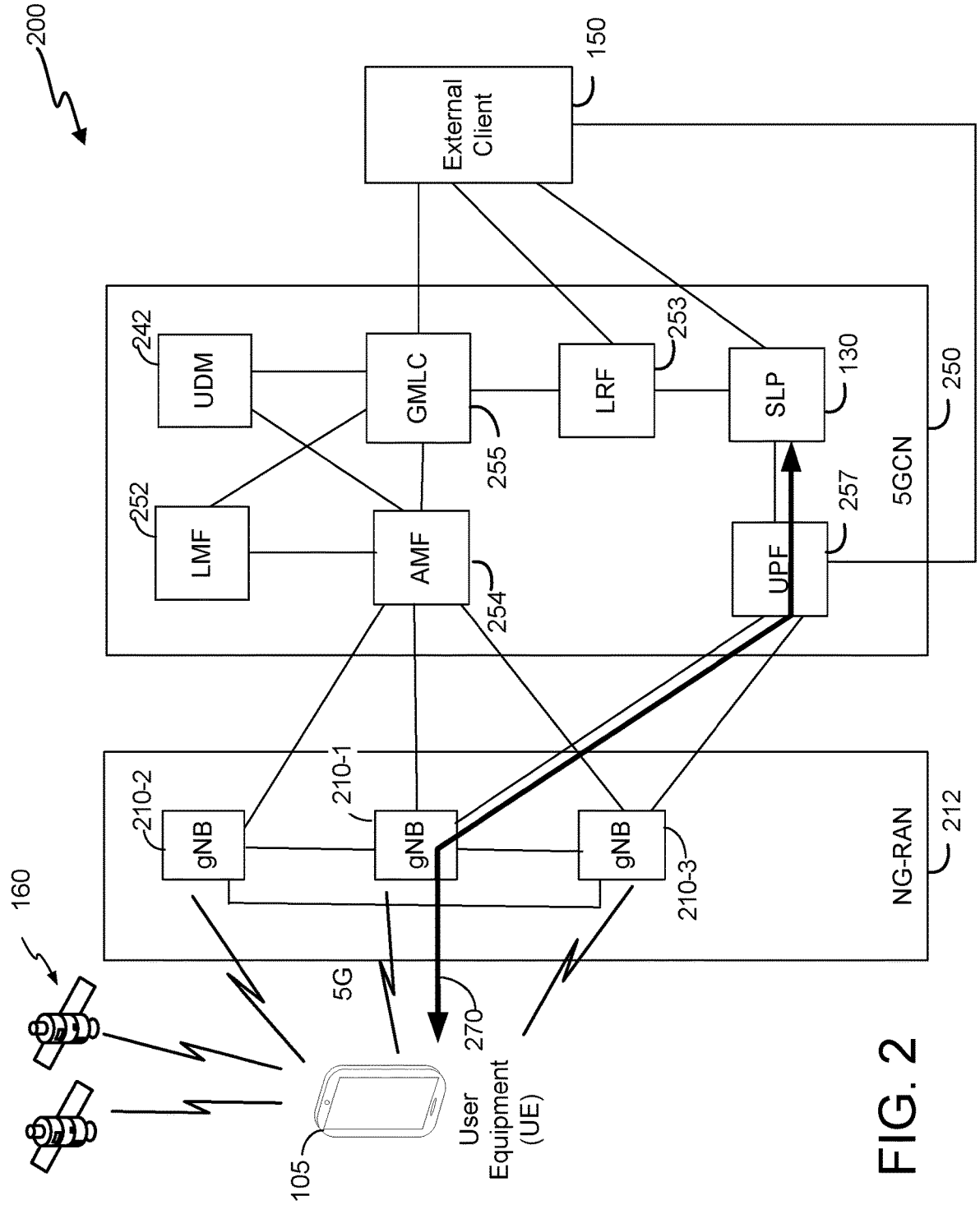
FIG. 2 is a system diagram illustrating certain features of a Fifth Generation (5G) communication system comprising a mobile device and a cellular network, in accordance with an alternative example implementation.

FIG. 2 shows a diagram of a communication system 200, according to an alternative embodiment to the embodiment of communication system 100 described above with reference to FIG. 1. In communication system 200, UE 105, SVs 160 and external client 150 may operate in connection with Fifth Generation (5G) features of communication system 200. Here, the communication system 200 comprises a UE 105, and components of a Fifth Generation (5G) network, comprising a Next Generation RAN (NG-RAN) 212 and a 5G Core Network (5GCN) 250. NG-RAN 212 plus 5GCN 250 may comprise a 5G System (5GS) (also referred to as 5G network) which may function as a VPLMN or an HPLMN for UE 105. When functioning as a VPLMN, there may be a separate HPLMN for the UE 105 (not shown in FIG. 2) that communicates with the 5GCN 250 (e.g. via the Internet). The communication system 200 may further utilize information from satellite vehicles (SVs) 160 for a Global Navigation Satellite System (GNSS) like the Global Positioning System (GPS), GLONASS, Galileo, Beidou or some other local or regional Satellite Positioning System (SPS) such as IRNSS, EGNOS or WAAS. Additional components of the communication system 200 are described below. The communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 160, gNBs 210, external clients 150, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G network, similar network implementations and configurations may be used for other communication technologies, such as 3G, Long Term Evolution (LTE), IEEE 802.11 WiFi (also referred to as Wi-Fi) etc.

Base stations (BSs) in the NG-RAN 212 shown in FIG. 2 comprise NR Node Bs, also referred to as gNBs, 210-1, 210-2 and 210-3 (collectively and generically referred to herein as gNBs 210). Pairs of gNBs 210 in NG-RAN 212 may be connected to one another—e.g. directly as shown in FIG. 2 or indirectly via other gNBs 210. Access to the 5G network is provided to UE 105 via wireless communication between the UE 105 and one or more of the gNBs 210, which may provide wireless communication access to the 5GCN 250 on behalf of the UE 105 using 5G NR. In FIG. 2, the serving gNB for UE 105 is assumed to be gNB 210-1, although other gNBs (e.g. gNB 210-2 and/or gNB 210-3) may act as a serving gNB if UE 105 moves to another location or may act as a secondary gNB to provide additional throughout and bandwidth to UE 105. Some gNBs 210 in FIG. 2 (e.g. gNB 210-2 or gNB 210-3) may be configured to function as positioning-only beacons which may transmit signals (e.g. a Positioning Reference Signal (PRS)) to assist positioning of UE 105 but may not receive signals from UE 105 or from other UEs.

As noted, while FIG. 2 depicts nodes configured to communicate according to 5G communication protocols, nodes configured to communicate according to other communication protocols, such as, for example, the LTE protocol or IEEE 801.11 WiFi, may be used. Such nodes, configured to communicate using different protocols, may be controlled, at least in part, by the 5GCN 250. Thus, the NG-RAN 212 may include any combination of gNBs, evolved Node Bs (eNBs) supporting LTE access, or other types of base stations or access points. As an example, NG-RAN 212 may include one or more next generation eNBs (ng-eNBs) which provide LTE wireless access to UE 105 and which may connect to gNBs 210 in NG-RAN 212 and/or to entities in 5GCN 250 such as an Access and Mobility Management Function (AMF) 254 and a User Plane Function (UPF) 257.

The gNBs 210 can communicate with the AMF 254, which, for positioning functionality, communicates with a Location Management Function (LMF) 252. The AMF 254 may support access and registration by the UE 105, mobility of the UE 105, including cell change and handover and may participate in supporting a signaling connection to the UE 105 and possibly helping establish and release Protocol Data Unit (PDU) sessions for UE 105. Other functions of AMF 254 may include: termination of a control plane (CP) interface from NG-RAN 212; termination of Non-Access Stratum (NAS) signaling connections from UEs such as UE 105; NAS ciphering and integrity protection; registration management; connection management; reachability management; mobility management; transport of Short Message Service (SMS) messages between UE 105 and an SMS Function (SMSF) (not shown in FIG. 2); access authentication and authorization.

The LMF 252 may support positioning of the UE 105 when UE 105 accesses the NG-RAN 212 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), round trip signal propagation time (RTT), WLAN positioning and/or other position methods.

The LMF 252 may also process location services requests for the UE 105, e.g., received from the AMF 254. In some embodiments, a node/system that implements the LMF 252 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of the location of UE 105) may be performed at the UE 105 (e.g., using signal measurements obtained by UE 105 for signals transmitted by wireless nodes such as gNBs 210, and assistance data provided to the UE 105, e.g. by LMF 252).

The GMLC 255 may support a location request for the UE 105 received from an external client 150 or from a Home GMLC (HGMLC), not shown, and may forward such a location request to the AMF 254 for forwarding by the AMF 254 to the LMF 252 or may forward the location request directly to the LMF 252. A location response from the LMF 252 (e.g. containing a location estimate for the UE 105) may be similarly returned to GMLC 255 either directly or via the AMF 254 and the GMLC 255 may then return the location response (e.g., containing the location estimate) to the external client 150 or to a HGMLC. The GMLC 255 is shown connected to both the AMF 254 and LMF 252, but only one of these connections may be supported by 5GCN 250 in some implementations.

A Location Retrieval Function (LRF) 253 may be connected to the GMLC 255, as defined in 3GPP Technical Specification (TS) 23.271. LRF 253 may perform the same or similar functions to GMLC 255, with respect to receiving and responding to a location request from an external client 150 that corresponds to a Public Safety Answering Point (PSAP) supporting an emergency call from UE 105.

The LMF 252 and the gNBs 210 may communicate using a New Radio Position Protocol A (NRPPa), defined in 3GPP Technical Specification (TS) 38.455, with NRPPa messages being transferred between the gNBs 210 and the LMF 252 via the AMF 254. The LMF 252 and UE 105 may communicate using the LTE Positioning Protocol (LPP) defined in 3GPP TS 36.355, where LPP messages are transferred inside NAS transport messages between the UE 105 and the AMF 254 via a serving gNB 210-1 for UE 105, and where AMF 254 relays the LPP messages to and from LMF 252. The LPP protocol may be used to support positioning of UE 105 using UE assisted and/or UE based position methods such as A-GNSS, RTK, OTDOA, ECID and/or WLAN positioning. The NRPPa protocol may be used to support positioning of UE 105 using network based position methods such as ECID (e.g. when used with measurements obtained by a gNB 210 of signals transmitted by UE 105) and/or may be used by LMF 252 to obtain location related information from gNBs 210. For example, location related information provided by the gNBs 210 to the LMF 252 using NRPPa may include timing and configuration information for PRS transmission from gNBs 210 and/or location coordinates of the gNBs 210. The LMF 252 can then provide some or all of this location related information to the UE 105 as assistance data in an LPP message via the NG-RAN 212 and the 5GCN 250.

An LPP message sent from the LMF 252 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 210 (or supported by one or more ng-eNBs or eNBs). The UE 105 may send the measurements back to the LMF 252 in an LPP message (e.g. inside a 5G NAS message) via the serving gNB 210-1 and the AMF 254.

In some embodiments, LPP may be augmented by or replaced by an NR positioning protocol (NPP or NRPP) which supports position methods such as OTDOA and ECID for NR radio access. For example, an LPP message may contain an embedded NPP message or may be replaced by an NPP message.

As illustrated, 5GCN 250 includes a Unified Data Management (UDM) 242 that may be connected to the GMLC 255 (e.g., via the Internet), as well as a User Plane Function (UPF) 257. The UDM 242 is analogous to a Home Subscriber Server (HSS) for LTE access, and if desired, the UDM 242 may be combined with an HSS. The UDM 242 is a central database that contains user-related and subscription related information for UE 105 and may perform the following functions: UE authentication, UE identification, access authorization, registration and mobility management, subscription management and SMS management. The UPF 257 may support voice and data bearers for UE 105 and may enable UE 105 voice and data access to other networks such as the Internet. UPF functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

The UPF 257 may be connected to a location server (LS), such as the SLP 130. The SLP 130 may support the SUPL user plane (UP) location solution defined by the Open Mobile Alliance (OMA) and may support location services for UE 105 based on subscription information for UE 105 stored in SLP 130. The SLP 130 may function as a home SLP (SLP) for UE 105, a Discovered SLP (D-SLP) and/or as an Emergency SLP (E-SLP) (not shown in FIG. 2). SLP 130 and LMF 252 in communication system 200 are both examples of an LS that may employ the LPP and/or LPP/LPPe protocols for positioning of UE 105.

To support a SUPL location session between UE 105 and SLP 130 in communication system 200, the UE 105 and SLP 130 may exchange SUPL messages at a user plane level using IP and TCP (or possibly UDP for an initial SUPL INIT message) as transport protocols. FIG. 2 shows a typical path 270 for a SUPL message, which comprises routing the SUPL message through gNB 210-1 and UPF 257, in this order for a SUPL message sent from UE 105 to SLP 130 or in the reverse order for a SUPL message sent from SLP 130 to UE 105. For example, in the signaling flows described later for FIGS. 3-6, each of the SUPL messages shown as being transferred between the UE 105 and SLP 130 may be transferred via routing along the path 270, when the signaling flows are supported by communication system 200.

The GMLC 255 may be connected to UDM 242 for UE 105. One or more of GMLC 255, UPF 257, LRF 253 and SLP 130 may be connected to external client 150, e.g., through another network, such as the Internet. In some cases, a Requesting GMLC (RGMLC) located in another PLMN (not shown in FIG. 2) may be connected to GMLC 255 (e.g., via the Internet) in order to provide location access to UE 105 on behalf of external clients connected to the RGMLC.

The RGMLC and GMLC 255 may support location access to UE 105 using the 3GPP CP solution defined in 3GPP TS 23.271 and in 3GPP TS 23.501 and 3GPP TS 23.502.

It should be understood that while a single network (comprising NG-RAN 212 and 5GCN 250) is illustrated in FIG. 2, a separate HPLMN may be present, which may include a separate GMLC, a separate LRF a separate UPF, and may include the SLP 130 (e.g. connected to the separate UPF).

While communication system 200 is described as supporting NR wireless access (via gNBs 210) and/or LTE wireless access (via ng-eNBs in NG-RAN 212), future releases of 3GPP specifications may define a capability to support NB-IoT wireless access to NG-RAN 212 and 5GCN 250 via ng-eNBs in NG-RAN 212 and/or a narrowband version of NR wireless access via gNBs 210 in NG-RAN 212. In such a case, problems with support of location using SUPL for NB-IoT wireless access to an EPS such as the EPS for communication system 100 may apply similarly or equally to NB-IoT or narrowband NR wireless access by a UE 105 to NG-RAN 212 and 5GCN 150.

For Narrow Band Internet of Things (NB-IoT) wireless access (and possibly for a future narrowband version of NR), it is expected that many or most UEs will have only one radio receiver (RF chain) to reduce cost and power (battery) usage. A consequence for location of such a UE is that the UE may not be able to obtain location measurements for non-NB-IoT radio signals such as GNSS or WLAN signals when in an NB-IoT connected state.

In addition, even measurements of NB-IoT radio signals could be problematic. This problem has been anticipated by 3GPP standards for control plane location, which allow an NB-IoT UE 105 to enter idle state after being requested to provide location measurements by a location server (e.g. E-SMLC 124 in communication system 100). After entering an idle state, the UE 105 may obtain the measurements, re-enter connected state and send the measurements to the location server (e.g. E-SMLC 124). The location server may be aware (e.g. from information provided by a serving MME 122) that UE 105 has NB-IoT access. This may allow the location server to assign a longer maximum response time to the UE 105 when requesting location measurements which can avoid the location server timing out on a response from the UE 105. However, for an SLP location server, such as SLP 130, using the SUPL user plane location solution, the SLP 130 may not be aware that the UE 105 has NB-IoT access (e.g. since no interface has been defined by OMA or 3GPP between an SLP and an MME 122 or AMF 254 which could allow the MME 122 or AMF 254 to inform the SLP that a UE 105 has NB-IoT access). In addition, even if an SLP 130 was aware of NB-IoT access by a UE 105, the entry of the UE 105 into an idle state could cause a TCP connection between the UE 105 and SLP 130 to disconnect due to lack of responses to TCP keep alive messages and/or failure of TCP retransmission. This could lead to a failure to locate the UE 105.

As discussed herein, a solution to the above-identified problem may include, e.g., a first step in which the UE 105 indicates to the SLP 130 that the UE 105 is about to enter idle state in order to obtain requested location measurements. The indication may be carried in a SUPL message (e.g. SUPL POS or SUPL END message) or in an LPP message (e.g. an LPP Provide Location Information (PLI) message). The indication, in some embodiments, may be encoded as a parameter, flag, cause value or error cause value (e.g. an LPP or SUPL error cause value) in an LPP or SUPL message. For example, in one embodiment, the indication may comprise a new value for a SUPL Status Code parameter which may be included in a SUPL END message. In another embodiment, the indication may comprise a new value for a "LocationError" parameter which may be included in an LPP PLI message.

Additionally, in a second step, the SLP 130 or the UE 105 may release the SUPL session, if it is not already released. Following, a short time period (e.g. 30-120 seconds) to allow the UE 130 to enter idle state and obtain location measurements, the UE 105 or SLP 130 may initiate a new SUPL session in which the UE 105 provides the location measurements to the SLP 130 (e.g. in an LPP PLI message carried in a SUPL POS INIT message). The SLP 130 may then determine a location for the UE 105, which is returned to the UE 105, e.g., when the first session was UE initiated, or to an external client 150, e.g., for an SLP initiated first session.

The new SUPL session may be a copy of the first SUPL session and may be initiated by the same end that initiated the first SUPL session (i.e., by the UE 105 for a UE initiated first session or by the SLP 130 for an SLP initiated first session), or by a different end (i.e., by the UE 105 for an SLP initiated first session or by the SLP 130 for a UE initiated first session). This may allow the same identification information to be used for both SUPL sessions (e.g., the same SUPL Application ID for a UE initiated first session or the same SUPL Notification parameter for an SLP initiated first session), which can allow the non-initiating end to verify that the second SUPL session is a continuation of the first SUPL session (and thereby avoid accidental association of the second SUPL session with a first SUPL session that is for a different external client or for a different location application in the UE 105).

Figure 3:
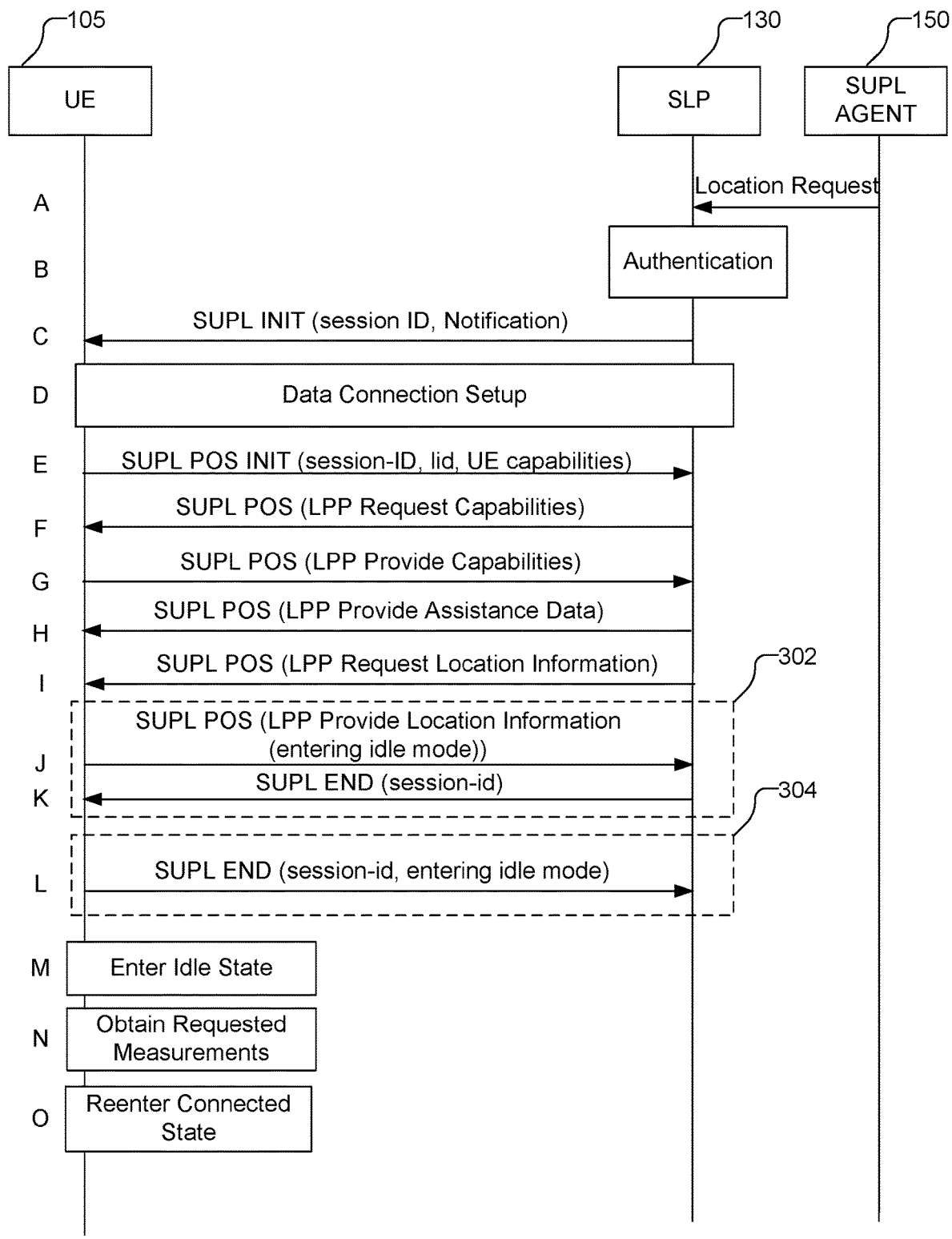
FIGS. 3 and 4 show a signaling flow illustrating a process of determining a location for a user equipment (UE) with NB-IoT wireless access for a Network Initiated SUPL session.
Figure 4:
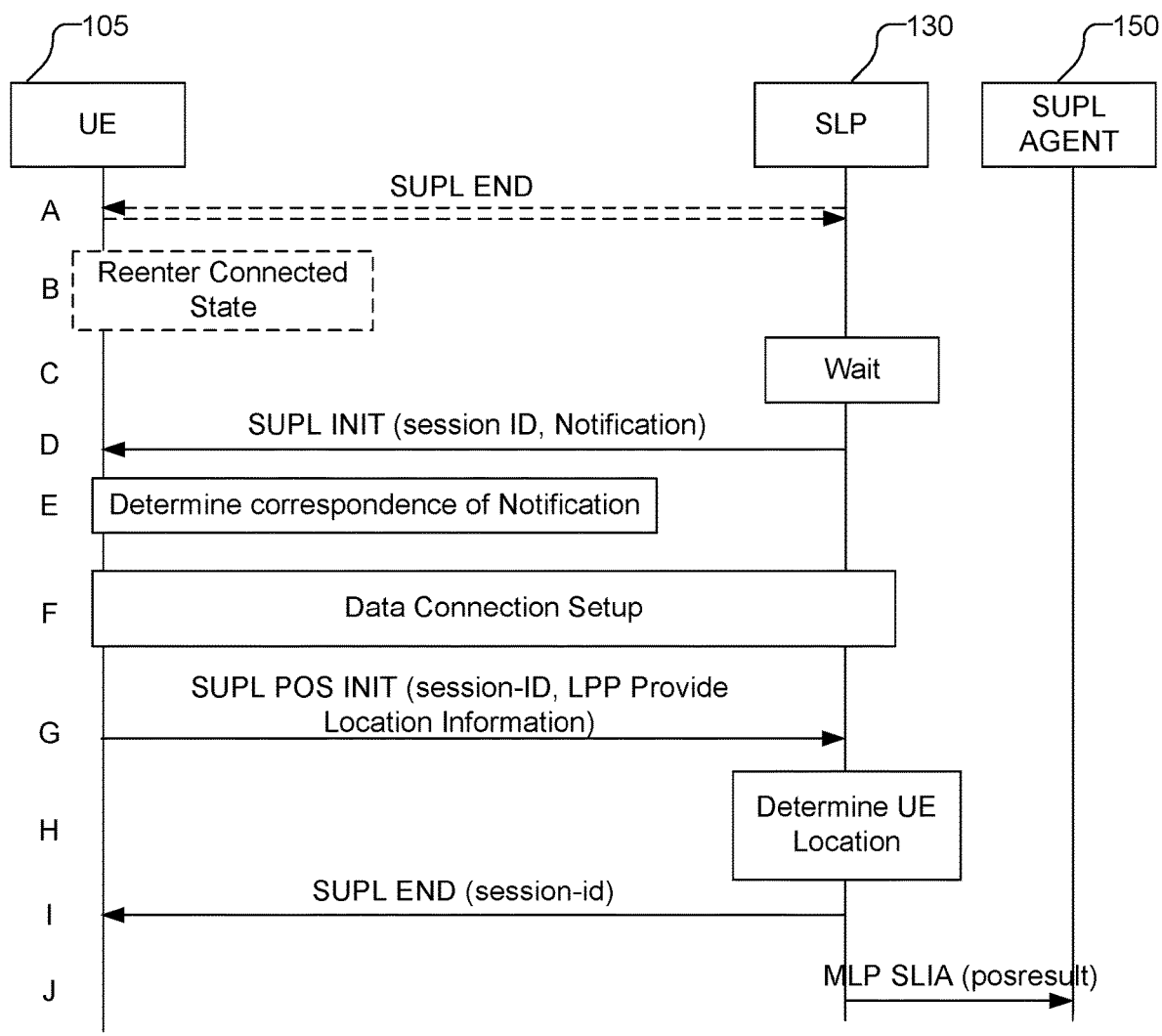

FIGS. 3 and 4 show a signaling flow illustrating a process of determining a location for a UE 105 during which the UE 105 enters an idle state to obtain location for a Network Initiated SUPL session. The signaling flow in FIGS. 3 and 4 may be applicable to the UE 105 and SLP 130 in communication system 100 (e.g. when UE 105 has NB-IoT wireless access to eNB 110) or may be applicable to the UE 105 and SLP 130 in communication system 200 (e.g. when UE 105 has NB-IoT wireless access to an ng-eNB in NG-RAN 212 or has a future narrowband NR wireless access to gNB 210-1). FIG. 3, for example, illustrates the initiation and termination of an initial positioning session when location is initiated by SLP 130. As illustrated, at stage A in FIG. 3, a SUPL Agent 150, corresponding to the external client 150 illustrated in FIGS. 1 and 2, sends a location request for the UE 105 to the SLP 130. The location request may be, e.g., an OMA Mobile Location Protocol (MLP) Standard Location Immediate Request (SLIR) message, which may include, e.g., identifiers for the UE 105 and the SUPL agent 150.

At stage B, the SLP 130 may authenticate the SUPL Agent 150 and check if the SUPL Agent 150 is authorized for the service it requests and may apply subscriber privacy for UE 105, based on the identifiers it received at stage A.

At stage C, the SLP 130 initiates a SUPL positioning session with the UE 105 by sending a SUPL INIT message to UE 105 (e.g. using SMS or UDP over IP). The SUPL INIT message contains a session-id (also referred to as a session ID), and may include a Notification parameter and may further include reasons for the location request, a proxy/non-proxy mode indicator and an intended positioning method.

At stage D, the UE 105 analyses the received SUPL INIT. If found to be non-authentic the UE 105 takes no further action. Otherwise, the UE 105 establishes or resumes a secure data connection with the SLP 130, e.g. using TCP and Transport Layer Security (TLS) protocols over IP. The secure data connection may then be used to transport further SUPL messages at stages E-L.

At stage E, the UE 105 sends a SUPL POS INIT message to the SLP 130. The SUPL POS INIT message may contain, e.g., a session-id, UE capabilities, a hash of the received SUPL INIT message (ver) and a Location ID (lid) parameter indicating a serving cell (or serving WiFi AP) for UE 105 and possibly serving cell (or serving WiFi AP) location measurements. The UE 105 capabilities may include the supported positioning methods (e.g., UE Assisted A-GPS, UE Based A-GPS, OTDOA, and/or ECID) and associated positioning protocols (e.g., RRLP, RRC, TIA-801 or LPP/LPPe). The UE 105 may include a request for Assistance Data in the SUPL POS INIT.

At stages F-I, the SLP 130 and UE 105 may exchange several successive SUPL POS positioning messages. For example, at stage F, the SLP 130 may send a SUPL POS message that includes an LPP Request Capabilities message.

At stage G, the UE 105 sends an SUPL POS message that includes an LPP Provide Capabilities message indicating the LPP positioning capabilities of UE 105.

At stage H, the SLP 130 may send assistance data to the UE 105 by sending a SUPL POS message that includes an LPP Provide Assistance Data message.

At stage I, the SLP 130 may request location information from the UE 105 by sending another SUPL POS message that includes an LPP Request Location Information message. If desired, stages H and I may be combined, e.g., with the same SUPL POS message including an LPP Provide Assistance Data message and an LPP Request Location Information message.

The UE 105 then sends an indication to the SLP 130 that the UE 105 is going to enter an idle state so that the UE 105 may obtain the requested location information (e.g. based on UE 105 having just a single RF chain). The SUPL positioning session then ends. As indicated by boxes 302 and 304, there are alternative ways in which the SUPL positioning session may end. For example, as illustrated in box 302, at stage J, the UE 105 sends a message to the SLP 130 with an indication that the UE 105 will enter idle mode, e.g., by sending a SUPL POS message with an embedded LPP Provide Location Information message. The LPP Provide Location Information, for example, may include a parameter, flag, cause value, error cause value or LocationError value that indicates that the UE 105 will enter idle mode (also referred to herein as idle state). The indication that the UE will enter the idle state may include an estimate of a time interval between a time of entering the idle state and a time of re-entering a connected state.

At stage K, the SLP 130 sends a message to the UE 105 ending the location session, e.g., a SUPL END message. The UE 105 releases the secure data connection to the SLP 130 and releases all resources related to this session.

As indicated by box 304, as an alternative to box 302, the UE 105 may end the location session at the same time as indicating that the UE 105 will enter idle mode. For example, at stage L, the UE 105 may send a message to the SLP 130 ending the location session, e.g., a SUPL END message, that includes the indication that the UE 105 will enter idle mode, e.g., which may be encoded as a parameter, flag, cause value, error cause value or Status Code value in the message. The indication that the UE will enter the idle state may include an estimate of a time interval between a time of entering the idle state and a time of re-entering a connected state. The SLP 130 then releases the secure data connection to the UE 105 and releases all resources related to this session.

At stage M, the UE 105 enters an idle state in which the UE 105 is not connected with the wireless network, e.g., there is no active signaling connection to the network (e.g. such as a no signaling connection to E-UTRAN 112 or to NG-RAN 212).

At stage N, the UE 105 obtains the location measurements requested at stage I while in the idle state (e.g. using a single RF chain for UE 105).

At stage O, the UE 105 reenters a connected state with the wireless network (e.g. with E-UTRAN 112 and EPC 120 or with NG-RAN 212 and 5GCN 250) after the location measurements are obtained.

FIG. 4 is a signaling flow which continues the signaling flow in FIG. 3 and illustrates the initiation of a second positioning session after the initial positioning session illustrated in FIG. 3 is terminated by either the SLP 130 or UE 105 (illustrated in FIG. 4 as stage A) and the UE 105 has reentered the connected state after obtaining the location measurements (illustrated in FIG. 4 as stage B). At stage C in FIG. 4, the SLP 130 may wait a short time period, e.g., 30-120 seconds, during which the UE 105 enters the idle state, obtains the location measurements and re-enters a connected state (e.g. as at stages M, N and O in FIG. 3).

At stage D, the SLP 130 initiates a new SUPL positioning session with the UE 105 by sending a SUPL INIT message to UE 105 (e.g. using SMS or UDP/IP). The new SUPL location session may be a copy of the initial SUPL location session, illustrated in FIG. 3, as the SUPL INIT message can provide the same identification information as used in the initial location session. For example, the same Notification parameter may be included in the SUPL INIT message of stage C of FIG. 3 and the second SUPL INIT message in stage D of FIG. 4.

In one embodiment, in addition to or instead of including the same Notification parameter in the SUPL INIT message, the SLP 130 may include a session identification (ID) in the SUPL INIT message at stage D which can be associated with the session ID used for the initial SUPL location session. In SUPL, a session ID may comprise an SLP assigned session ID combined with a separate SET (or UE) assigned session ID. An SLP session ID can include an SLP address (e.g. an IP address or Fully Qualified Domain Name (FQDN)) and an octet string (e.g. comprising four octets), which is referred to here as either a new or initial "SLP assigned octet string" when applied to the new or initial SUPL location session, respectively. A SET session ID can include a SET ID (e.g. a Mobile Station International Subscriber Directory Number (MSISDN) or International Mobile Subscriber Identity (IMSI)) and an integer (e.g. between zero and 65535), which is referred to here as either a new or initial "SET assigned integer" when applied to the new or initial SUPL location session, respectively. For the new SUPL location session, the SLP 130 may include a new SLP assigned octet string (for a new session ID) which includes, or is some mapping of (e.g. a mathematical transformation of), the initial SLP assigned octet string and/or the initial SET assigned integer. For example, the SLP 130 could: (i) equate the new SLP assigned octet string to the initial SLP assigned octet string; (ii) include the initial SET assigned integer (when expressed in binary) within the new SLP assigned octet string; or (iii) include part (e.g. low or high order bits) of the initial SLP assigned octet string and part (e.g., low or high order bits) of the initial SET assigned integer (when expressed in binary) in the new SLP assigned octet string.

At stage E, the UE 105 determines a correspondence of the new and initial session IDs and/or of the identification information (e.g., the Notification parameters from the SUPL INIT message of stage C of FIG. 3 and the second SUPL INIT message in stage D of FIG. 4). The UE 105 may thereby determine that the SUPL INIT message received at stage D of FIG. 4 resumes the location session that was terminated in FIG. 3.

At stage F in FIG. 4, the UE 105 establishes or resumes a secure data connection with the SLP 130, e.g. using TCP and Transport Layer Security (TLS) protocols over IP. For example, the UE 105 may resume the secure data connection with the SLP 130 that was used for the first SUPL session in FIG. 3. The secure data connection may then be used to transport further SUPL messages at stages G and I At stage G, UE 105 sends a SUPL POS INIT message to the SLP 130. The SUPL POS INIT message from the UE 105 includes, e.g., the location information that was obtained while the UE 105 was in the idle state (at stage N in FIG. 3), e.g., as an LPP Provide Location Information message.

At stage H, the SLP 130 determines (e.g. calculates) a position estimate for the UE 105 based on the received location information.

At stage I, once the position determination is complete the SLP 130 sends a SUPL END message to the UE 105 to end the location session. The UE 105 releases the secure data connection to the SLP 130 and release all resources related to this session.

At stage J, the SLP 130 sends the position estimate back to the SUPL Agent 150, e.g. in an MLP Standard Location Immediate Answer (SLIA) message, and the SLP 130 releases all resources related to the session.

Figure 5:
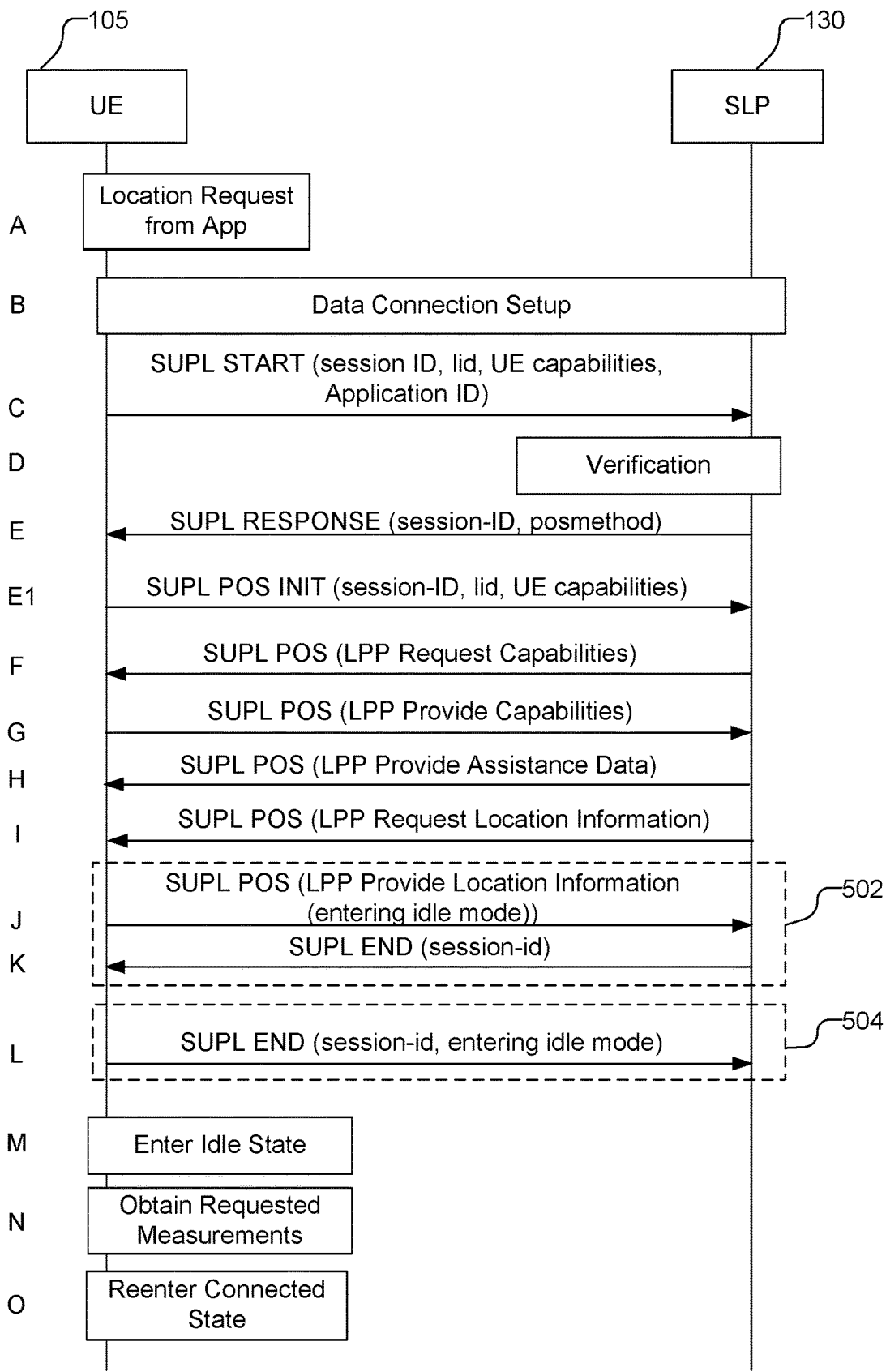
FIGS. 5 and 6 show a signaling flow illustrating a process of determining a location for a UE with NB-IoT wireless access for a UE Initiated SUPL session.
Figure 6:
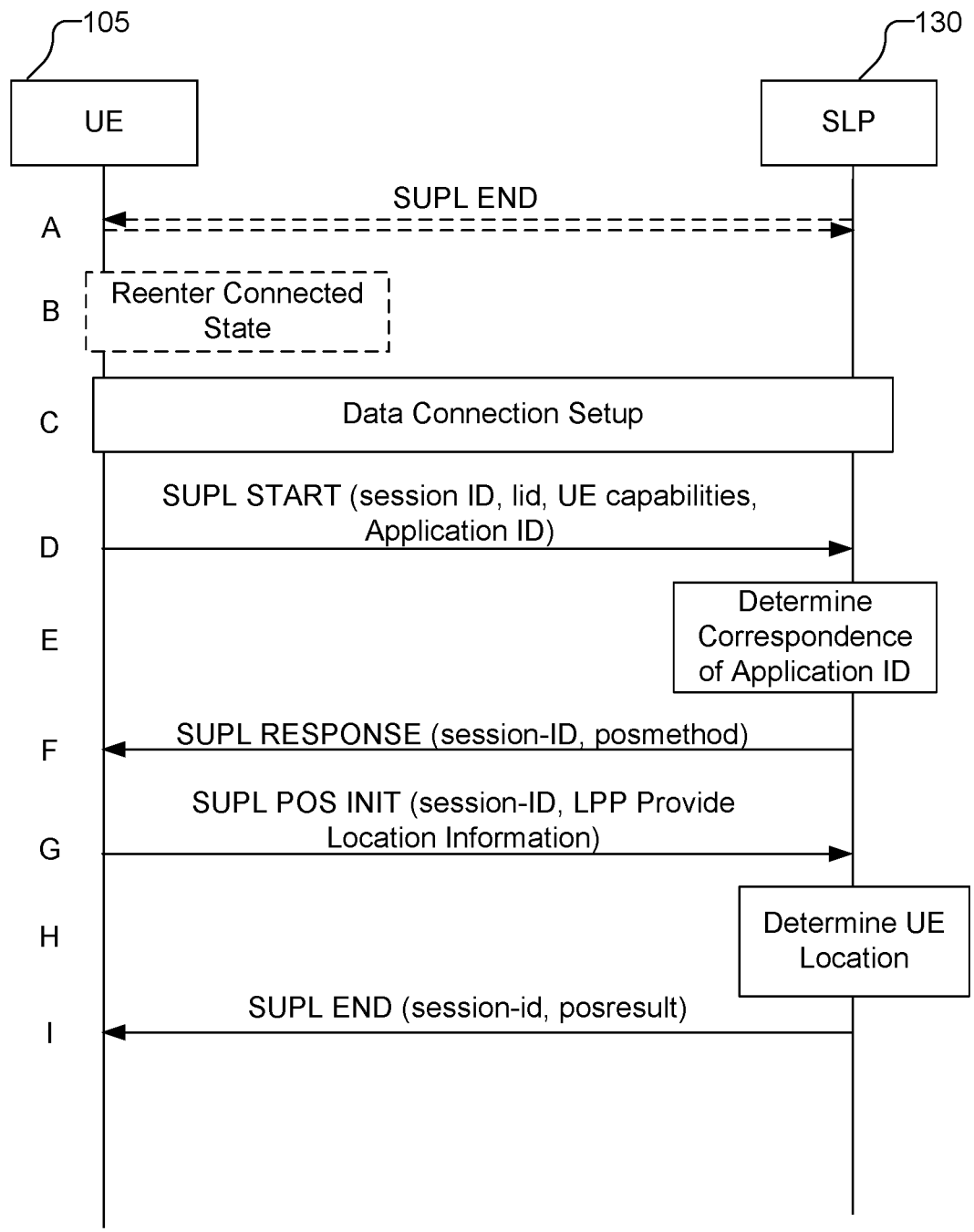

FIGS. 5 and 6 show a signaling flow illustrating a process of determining a location for a UE 105 during which the UE 105 enters an idle state to obtain location measurements for a UE initiated SUPL session. The signaling flow in FIGS. 5 and 6 may be applicable to the UE 105 and SLP 130 in communication system 100 (e.g. when UE 105 has NB-IoT wireless access to eNB 110) or may be applicable to the UE 105 and SLP 130 in communication system 200 (e.g. when UE 105 has NB-IoT wireless access to an ng-eNB in NG-RAN 212 or has a future narrowband NR wireless access to gNB 210-1). FIG. 5, for example, illustrates the initiation and termination of an initial positioning session when location is initiated by UE 105. As illustrated, at stage A in FIG. 5, there is a location request from an application (App) within the UE 105.

At stage B, the UE 105 establishes or resumes a secure data connection with the SLP 130, e.g. using TCP and Transport Layer Security (TLS) protocols over IP. The secure data connection may then be used to transport further SUPL messages at stage C and stages E-L.

At stage C, the UE initiates a SUPL positioning session by sending a SUPL START message to SLP 130. The SUPL START message contains a session-id, UE capabilities and Location ID (lid) parameter, and may include an Application ID that identifies the App within the UE that requested the location information at stage A.

At stage D, the SLP 130 may verify that the UE 105 is authorized for the service it requests based on identifiers received at stage B and/or stage C (e.g. an identification for UE 105).

At stage E, the SLP 130 determines a position method consistent with the SUPL START message (e.g. including position method(s) supported by the UE 105) and responds by sending a SUPL RESPONSE to the UE 105. The SUPL RESPONSE contains a session-id and the position method.

At stage E1, the UE 105 sends a SUPL POS INIT message to the SLP 130. The SUPL POS INIT message may contain, e.g., a session-id, UE capabilities, and a Location ID (lid) parameter indicating a serving cell (or serving WiFi AP) for UE 105 and possibly serving cell (or serving WiFi AP) location measurements. The UE 105 capabilities may include the supported positioning methods (e.g., UE Assisted A-GPS, UE Based A-GPS, OTDOA and/or ECID) and associated positioning protocols (e.g., RRLP, RRC, TIA-801 or LPP/LPPe). The UE 105 may include a request for Assistance Data in the SUPL POS INIT.

At stages F-I, the SLP 130 and UE 105 may exchange several successive SUPL POS positioning messages. For example, at stage F, the SLP 130 may send a SUPL POS message that includes an LPP Request Capabilities message.

At stage G, the UE 105 sends a SUPL POS message that includes an LPP Provide Capabilities message indicating the LPP positioning capabilities of UE 105.

At stage H, the SLP 130 may send assistance data to the UE 105 by sending a SUPL POS message that includes an LPP Provide Assistance Data message.

At stage I, the SLP 130 may request location information from the UE 105 by sending another SUPL POS message that includes an LPP Request Location Information message. If desired, stages H and I may be combined, e.g., with the same SUPL POS message including an LPP Provide Assistance Data message and an LPP Request Location Information message.

The UE 105 then sends an indication to the SLP 130 that the UE 105 is going to enter an idle state so that the UE 105 may obtain the requested location information (e.g. based on UE 105 having just a single RF chain). The SUPL positioning session then ends. As indicated by boxes 502 and 504, there are alternative ways in which the SUPL positioning session may end. For example, as illustrated in box 502, at stage J, the UE 105 sends a message to the SLP 130 with an indication that the UE 105 will enter idle mode, e.g., by sending a SUPL POS message with an embedded LPP Provide Location Information message. The LPP Provide Location Information, for example, may include a parameter, flag, cause value, error cause value or LocationError value that indicates that the UE 105 will enter idle mode. The indication that the UE will enter the idle state may include an estimate of a time interval between a time of entering the idle state and a time of re-entering a connected state.

At stage K, the SLP 130 sends a message to the UE 105 ending the location session, e.g., a SUPL END message. The UE 105 then releases the secure data connection to the SLP 130 and releases all resources related to this session.

As indicated by box 504, as an alternative to box 502, the UE 105 may end the location session at the same time as indicating that the UE 105 will enter idle mode. For example, at stage L, the UE 105 may send a message to the SLP 130 ending the location session, e.g., a SUPL END message, that includes the indication that the UE 105 will enter idle mode, e.g., which may be encoded as a parameter, flag, cause value, error cause value or Status Code value in the message. The indication that the UE will enter the idle state may include an estimate of a time interval between a time of entering the idle state and a time of re-entering the connected state. The SLP 130 then releases the secure data connection to the UE 105 and releases all resources related to this session.

At stage M, the UE 105 enters an idle state in which the UE 105 is not connected with the wireless network, e.g., there is no active signaling connection to the network (e.g. such as a no signaling connection to E-UTRAN 112 or to NG-RAN 212).

At stage N, the UE 105 obtains the requested location measurements while in the idle state (e.g. using a single RF chain for UE 105).

At stage O, the UE 105 reenters a connected state with the wireless network (e.g. with E-UTRAN 112 and EPC 120 or with NG-RAN 212 and 5GCN 250) after the location measurements are obtained.

FIG. 6 is a signaling flow which continues the signaling flow in FIG. 5 and illustrates the initiation of a second SUPL positioning session after the initial positioning session illustrated in FIG. 5 is terminated by either the SLP 130 or UE 105 (illustrated in FIG. 6 as stage A) and the UE 105 has reentered the connected state after obtaining the location measurements (illustrated in FIG. 6 as stage B).

At stage C in FIG. 6, the UE 105 establishes or resumes a secure data connection with the SLP 130, e.g. using TCP and Transport Layer Security (TLS) protocols over IP. For example, the UE 105 may resume the secure data connection with the SLP 130 that was used for the first SUPL session in FIG. 5. The secure data connection may then be used to transport further SUPL messages at stages D, F, G and I.

At stage D, the UE 105 initiates a new SUPL positioning session with the SLP 130 by sending a SUPL START message to SLP 130. The new location session is a copy of the initial location session, illustrated in FIG. 5, as the SUPL START message can provide the same identification information as used in the initial location session. For example, the same Application ID parameter may be included in the SUPL START message of stage C of FIG. 5 and the second SUPL START message in stage D of FIG. 6.

In one embodiment, in addition to or instead of including the same identification information in the SUPL START message, the UE 105 may include a session ID in the SUPL START message at stage D which can be associated with the session ID used for the initial SUPL location session. For example, and using the same terminology as described for session ID association for FIG. 4, the UE 105 may include a new SET assigned integer (for a new session ID) which includes all or part of, or is some mapping of all or part of (e.g. a mathematical transformation of), the initial SLP assigned octet string and/or the initial SET assigned integer. For example, the UE 105 could: (i) equate the new SET assigned integer to the initial SET assigned integer; (ii) include part of the initial SLP assigned octet string within the new SET assigned integer (when expressed in binary); or (iii) include part (e.g. low or high order bits) of the initial SLP assigned octet string and part (e.g., low or high order bits) of the initial SET assigned integer (when expressed in binary) in the new SET assigned integer (when expressed in binary).

At stage E in FIG. 6, the SLP 130 determines a correspondence of the identification information, e.g., the Application ID parameters from the SUPL START message of stage C of FIG. 5 and the second SUPL START message in stage D of FIG. 6. The SLP 130 may thereby determine that the SUPL START message received at stage D of FIG. 6 resumes the location session that was terminated in FIG. 5.

At stage F in FIG. 6, the SLP 130 responds by sending a SUPL RESPONSE to the UE 105. The SUPL RESPONSE may contain a session-id and a posmethod parameter.

At stage G, UE 105 sends a SUPL POS INIT message to the SLP 130. The SUPL POS INIT message from the UE 105 includes, e.g., the location information that was obtained while the UE 105 was in the idle state, e.g., as an LPP Provide Location Information message.

At stage H, the SLP 130 determines a position estimate of the UE 105 based on the received location information.

At stage I, once the position determination is complete the SLP 130 sends a SUPL END message to the UE 105 to provide the position estimate and to terminate the location session with the UE 105. The UE 105 then releases all resources related to the session.

In some embodiments, the signaling flow of FIG. 6 may follow the signaling flow of FIG. 3, i.e., the initial location session may be initiated by the SLP 130, as illustrated in FIG. 3, while the second location session may be initiated by the UE 105, as illustrated in FIG. 6. Similarly, the signaling flow of FIG. 4 may follow the signaling flow of FIG. 5, i.e., the initial location session may be initiated by the UE 105, as illustrated in FIG. 5, while the second location session may be initiated by the SLP 130, as illustrated in FIG. 4. In these embodiments, the end (UE 105 or SLP 130) which initiates the second location session may include a session ID for the second location session which can be associated with the session ID used for the initial SUPL location session, as described previously for FIGS. 4 and 6. This may enable the end which does not initiate the second location session to determine that the second location session is a continuation of the initial location session.

Figure 7:
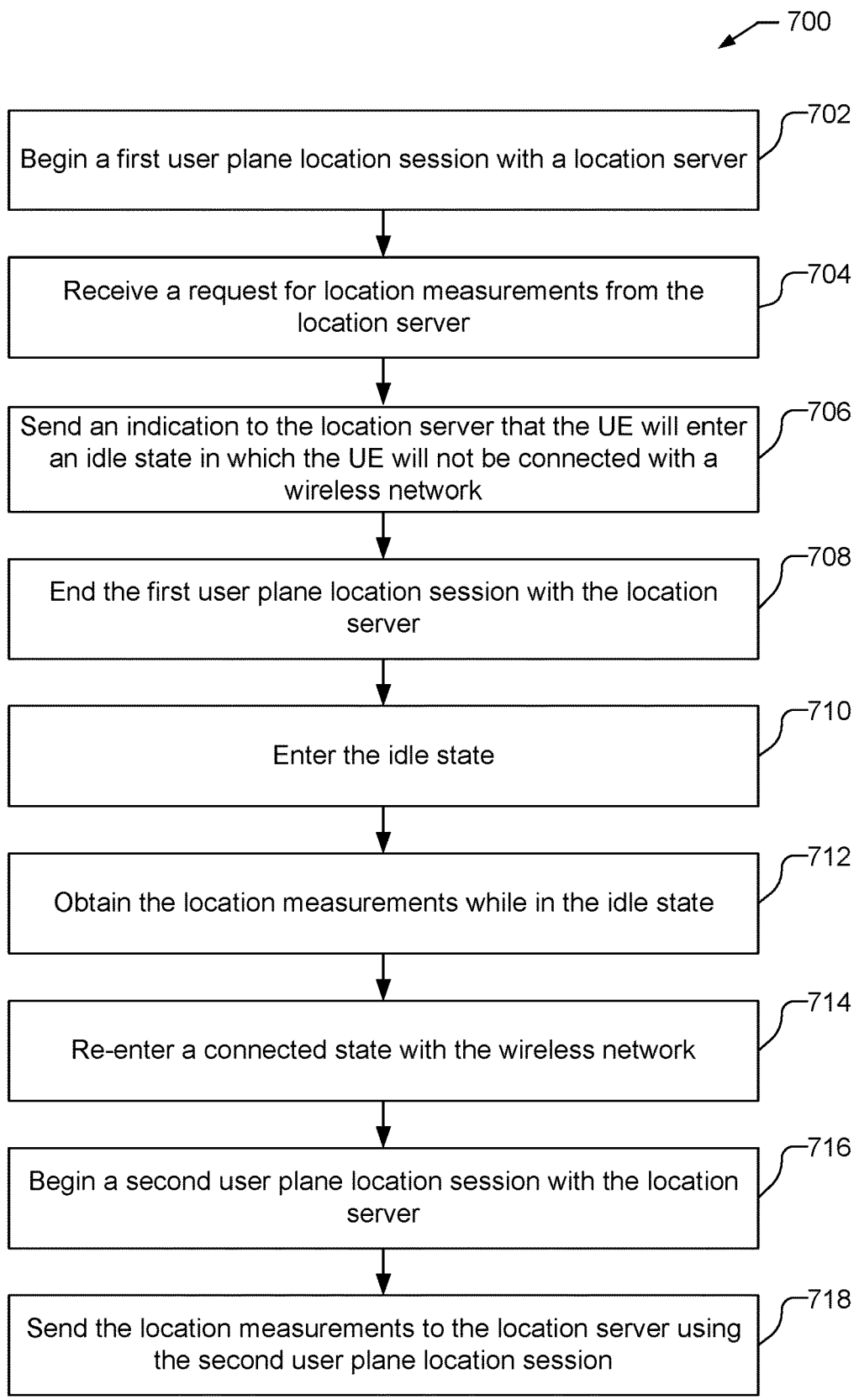
FIG. 7 shows a process flow illustrating a method of supporting location services for a UE performed by the UE.

FIG. 7 shows a process flow 700 illustrating a method of supporting location services for a user equipment (UE), e.g., when the UE is using NB-IOT radio access or a (e.g. future) narrowband New Radio (NR) radio access to access (or connect to) a wireless network. In some embodiments, the process flow 700 may be performed by other UEs using other types of radio access (e.g. LTE wideband access, NR access, WLAN access or eMTC access)—e.g. if a UE has limited resources (e.g. limited RF transceivers). The process flow 700 may be performed by the UE, such as UE 105 in communication systems 100 and 200. The process flow 700 may start at block 702, where the UE begins a first user plane location session (e.g. a SUPL session) with a location server, e.g., SLP 130 in communication systems 100, 200. By way of example, the first user plane location session may begin by the UE sending a message to the location server, such as a SUPL START message, e.g., as shown at stage C in FIG. 5. The message sent by the UE, for example, may include an identification parameter, such as an Application ID. In another implementation, the first user plane location session may begin by the UE receiving a message from the location server, such as a SUPL INIT message, e.g., as shown at stage C in FIG. 3. The message received by the UE, for example, may include an identification parameter, such as a Notification parameter.

At block 704, a request for location measurements may be received from the location server, e.g., as illustrated at stage I in FIG. 3 and stage I in FIG. 5. For example, the request may be received in an LPP or LPP/LPPe Request Location Information message (e.g. which may be transported within a SUPL POS message). The location measurements requested may include measurements for one or more position methods such as ECID, OTDOA, A-GNSS, WLAN, sensors etc. and/or may include a request for a location estimate for the UE.

At block 706, the UE sends an indication to the location server that the UE will enter an idle state in which the UE will not be connected with a wireless network, and at block 708, the UE ends the first user plane location session with the location server. The indication that the UE will enter the idle state may be, e.g., a parameter, flag, cause value, error cause value, LocationError value or Status Code value in a message sent to the location server. By way of example, in one implementation, the first user plane location session may end by the UE sending an end message (e.g. a SUPL END message) to the location server along with the indication that the UE will enter the idle state, e.g., as shown in boxes 304 and 504 in FIGS. 3 and 5. In another implementation, the UE may send the indication that the UE will enter the idle state to the location server, e.g., as a parameter, flag, cause value, error cause value, LocationError value or Status Code value in a message to the location server (e.g. an LPP Provide Location Information message), and the first user plane location session may end by the location server sending an end message to the UE in response, e.g., as shown in boxes 302 and 502 in FIGS. 3 and 5.

At block 710, the UE enters an idle state (e.g. by releasing a signaling connection to the wireless network), e.g., as illustrated at stage M in FIG. 3 and stage M in FIG. 5. At block 712, the UE obtains the location measurements while in the idle state, e.g., as illustrated at stage N in FIG. 3 and stage N in FIG. 5. At block 714, the UE re-enters a connected state with the wireless network (e.g. by requesting and obtaining a new signaling connection to the wireless network), e.g., as illustrated at stage O in FIG. 3 and stage O in FIG. 5.

At block 716, the UE begins a second user plane location session (e.g. a new SUPL session) with the location server. The second user plane location session may use an identification that is the same as the identification used for the first user plane location session. For example, the identification may be (i) an Application Identification (ID) parameter where the first user plane location session is started by the UE, (ii) a Notification parameter where the first user plane location session is started by the location server, or (iii) a session ID where the first user plane location session is started by either the UE or the location server. The second user plane location session may begin by the UE sending a message (e.g. a SUPL START message) to the location server (e.g., as shown in stage D of FIG. 6), or by the UE receiving a message (e.g. a SUPL INIT message) from the location server (e.g., as shown in stage D of FIG. 4).

At block 718, the UE sends the location measurements to the location server using the second user plane location session. For example, the UE may send the location measurements to the location server in an LPP or LPP/LPPe Provide Location Information message (e.g. which may be transported in a SUPL POS INIT message), e.g., as shown at stage G in FIG. 4 and stage G in FIG. 6.

By way of example, in one implementation, the first user plane location session with the location server may begin (at block 702) by the UE sending a first message to the location server, e.g., as shown at stage C in FIG. 5, or the UE receiving a second message from the location server, e.g. as shown at stage C in FIG. 3, and the second user plane location session with the location server may begin (at block 716) by the UE sending a third message to the location server, e.g., as shown at stage D in FIG. 6, or receiving a fourth message from the location server, e.g., as shown at stage D in FIG. 4. Here, the first message and the third message may comprise a first message type and the second message and the fourth message may comprise a second message type. For example, the first message type may be a Secure User Plane Location (SUPL) START message type and the second message type may be a SUPL INIT message type. For example, in one implementation, the UE may receive the second message, where the second message comprises a first notification parameter; receive the fourth message, where the fourth message comprises a second notification parameter, verify that the first notification parameter is the same as the second notification parameter, and send the location measurements to the location server using the second user plane location session, based on the verification. In another implementation, the UE may send the first message, where the first message comprises an application identification (ID), and send the third message, where the third message comprises the (same) application ID. In a further implementation, the UE may receive the fourth message, where the fourth message comprises a new session identification (ID), verify the new session ID is associated with (e.g. includes part of or is a mapping of part of) an initial session ID for the first user plane location session, and send the location measurements to the location server using the second user plane location session, based on the verification. In another implementation, the UE may send the third message, where the third message comprises a new session identification (ID), and where the new session ID is associated with (e.g. includes part of or is a mapping of part of) an initial session ID for the first user plane location session.

In one implementation, the first user plane location session with the location server may end (at block 708) by the UE sending a fifth message to the location server, e.g., as shown at stage L in FIG. 3 and stage L in FIG. 5, or the UE receiving a sixth message from the location server, e.g., as shown at stage K in FIG. 3 and stage K in FIG. 5. For example, the fifth message and the sixth message may each be a Secure User Plane Location (SUPL) END message. Additionally, the indication that the UE will enter the idle state (at block 706) may be a parameter, flag, cause value, error cause value, LocationError value or Status Code value in a seventh message sent to the location server. The indication that the UE will enter the idle state may include an estimate of a time interval between a time of entering the idle state and a time of re-entering the connected state. In some implementations, the seventh message may comprise the fifth message or a positioning protocol message. The positioning protocol message for example, may be a Long Term Evolution (LTE) Positioning Protocol (LPP) Provide Location Information (PLI) message, where the LPP PLI message is sent to the location server in a Secure User Plane Location (SUPL) POS message, e.g. as shown for stage J of FIG. 3 and stage J of FIG. 5.

Figure 8:
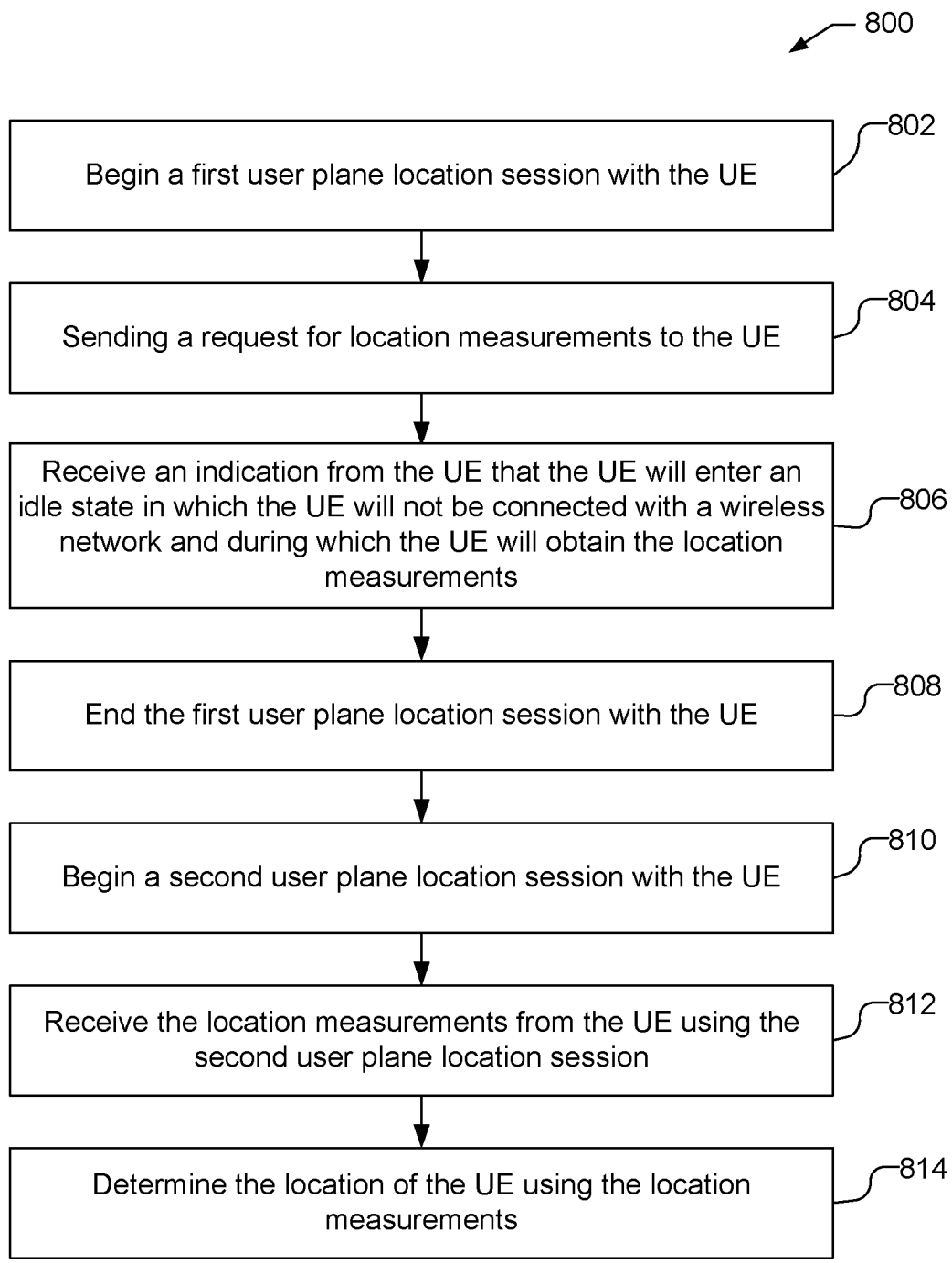
FIG. 8 shows a process flow 800 illustrating a method of supporting location services for a user equipment (UE) performed by a location server.

FIG. 8 shows a process flow 800 illustrating a method of supporting location services for a user equipment (UE), e.g., when the UE is using NB-IOT radio access or a (e.g. future) narrowband New Radio (NR) radio access to access (or connect to) a wireless network. In some embodiments, the process flow 800 may support location services for UEs using other types of radio access (e.g. LTE wideband access, NR access, WLAN access or eMTC access)—e.g. if a UE has limited resources (e.g. limited RF transceivers). The process flow 800 may be performed by the location server, such as SLP 130 in communication systems 100 and 200. The process flow 800 may start at block 802, where the location server begins a first user plane location session (e.g. a SUPL session) with the UE, e.g., UE 105 in communication systems 100, 200. By way of example, the first user plane location session may be started by the location server receiving a message from the UE, such as a SUPL START message, e.g., as shown at stage C in FIG. 5. The message received from the UE, for example, may include an identification parameter, such as an Application ID. In another implementation, the first user plane location session may begin by the location server sending a message to the UE, such as a SUPL INIT message, e.g., as shown at stage C in FIG. 3. The message sent by the location server, for example, may include an identification parameter, such as a Notification parameter.

At block 804, the location server sends a request for location measurements to the UE, e.g., as illustrated at stage I in FIG. 3 and stage I in FIG. 5. For example, the location server may send an LPP or LPP/LPPe Request Location Information message to the UE (e.g. transported in a SUPL POS message). The location measurements requested may include measurements for one or more position methods such as ECID, OTDOA, A-GNSS, WLAN, sensors etc. and/or may include a request for a location estimate for the UE.

At block 806, the location server receives an indication from the UE that the UE will enter an idle state in which the UE will not be connected with a wireless network and during which the UE will obtain the location measurements. At block 808, the location server ends the first user plane location session with the UE. The indication that the UE will enter the idle state may be, e.g., a flag or an error message received by the location server. By way of example, in one implementation, the first user plane location session may end by the location server receiving an end message (e.g. a SUPL END message) from the UE along with the indication that the UE will enter the idle state, e.g., as shown in boxes 304 and 504 in FIGS. 3 and 5. In another implementation, the location server may receive the indication that the UE will enter the idle state, e.g., as a parameter, flag, cause value, error cause value, LocationError value or Status Code value in a message sent to the location server (e.g. an LPP Provide Location Information message), and the first user plane location session may end by the location server sending an end message to the UE (e.g. a SUPL END message) in response, e.g., as shown in boxes 302 and 502 in FIGS. 3 and 5.

At block 810, the location server begins a second user plane location session (e.g. a new SUPL session) with the UE. The second user plane location session may use an identification that is the same as the identification used for the first user plane location session. For example, the identification may be (i) an Application Identification (ID) parameter where the first user plane location session is started by the UE, (ii) a Notification parameter where the first user plane location session is started by the location server, or (iii) a session ID where the first user plane location session is started by either the UE or the location server. The second user plane location session may begin by the location server receiving a message (e.g. a SUPL START message) from the UE (e.g., as shown in stage D of FIG. 6), or by the location server sending a message (e.g. a SUPL INIT message) to the UE (e.g., as shown in stage D of FIG. 4).

At block 812, the location measurements are received from the UE using the second user plane location session. For example, the location measurements may be received in an LPP or LPP/LPPe Provide Location Information message sent to the location server by the UE (e.g. transported in a SUPL POS INIT message), e.g., as shown at stage G in FIG. 4 and stage G in FIG. 6.

At block 814, the location of the UE is determined using the location measurements, e.g., as shown at stage H in FIG. 4 and stage H in FIG. 6. For example, the location server may calculate a location for the UE using almanac data (e.g. BSA data) configured in the location server in the case of location measurements for the ECID, OTDOA or WLAN position methods and/or using GNSS ephemeris and timing data for location measurements for the GNSS or A-GNSS position method.

In one implementation, the location server may send the location of the UE to an external client, e.g., as illustrated at stage J of FIG. 4. In one implementation, the location server may send the location of the UE to the UE, e.g. as illustrated at stage I of FIG. 6.

By way of example, in some implementations, the first user plane location session with the UE may begin (at block 802) by the location server sending a first message to the UE, e.g., as shown at stage C in FIG. 3, or receiving a second message from the UE, e.g., as shown at stage C in FIG. 5, and the second user plane location session with the UE may begin (at block 810) by the location server sending a third message to the UE, e.g., as shown at stage D in FIG. 4, or receiving a fourth message from the UE, e.g., as shown at stage D in FIG. 6. Here, the first message and the third message may comprise a first message type and the second message and the fourth message may comprise a second message type. For example, the first message type may be a Secure User Plane Location (SUPL) INIT message type and the second message type may be a SUPL START message type. For example, in one implementation, the location server may receive the second message, where the second message comprises a first application identification (ID), receive the fourth message, where the fourth message comprises a second application ID, verify the first application ID is the same as the second application ID, and determine the location of the UE using the location measurements, based on the verification. In another implementation, the location server may send the first message, where the first message comprises a notification, and send the third message, where the third message comprises the (same) notification. In a further implementation, the location server may receive the fourth message, where the fourth message comprises a new session identification (ID), verify the new session ID is associated with (e.g. includes part of or is a mapping of part of) an initial session ID for the first user plane location session, and determine the location of the UE using the location measurements, based on the verification. In another implementation, the location server may send the third message, where the third message comprises a new session identification (ID), and where the new session ID is associated with (e.g. includes part of or is a mapping of part of) an initial session ID for the first user plane location session.

In one implementation, the first user plane location session with the UE may end (at block 808) by the location server sending a fifth message to the UE, e.g., as shown at stage K in FIG. 3 and stage K in FIG. 5, or receiving a sixth message from the UE, e.g., as shown at stage L in FIG. 3 and stage L in FIG. 5. For example, the fifth message and the sixth message may each be a Secure User Plane Location (SUPL) END message. Additionally, the indication that the UE will enter the idle state may comprise a parameter, flag, cause value, error cause value, LocationError value or Status Code value in a seventh message received from the UE. In some implementations, the indication that the UE will enter the idle state may include an estimate of a time interval between a time of entering the idle state at the UE and a time of re-entering a connected state at the UE. In some implementations, the seventh message comprises the sixth message or a positioning protocol message. The positioning protocol message may comprise a Long Term Evolution (LTE) Positioning Protocol (LPP) Provide Location Information (PLI) message, where the LPP PLI message is received by the location server in a Secure User Plane Location (SUPL) POS message.

Figure 9:
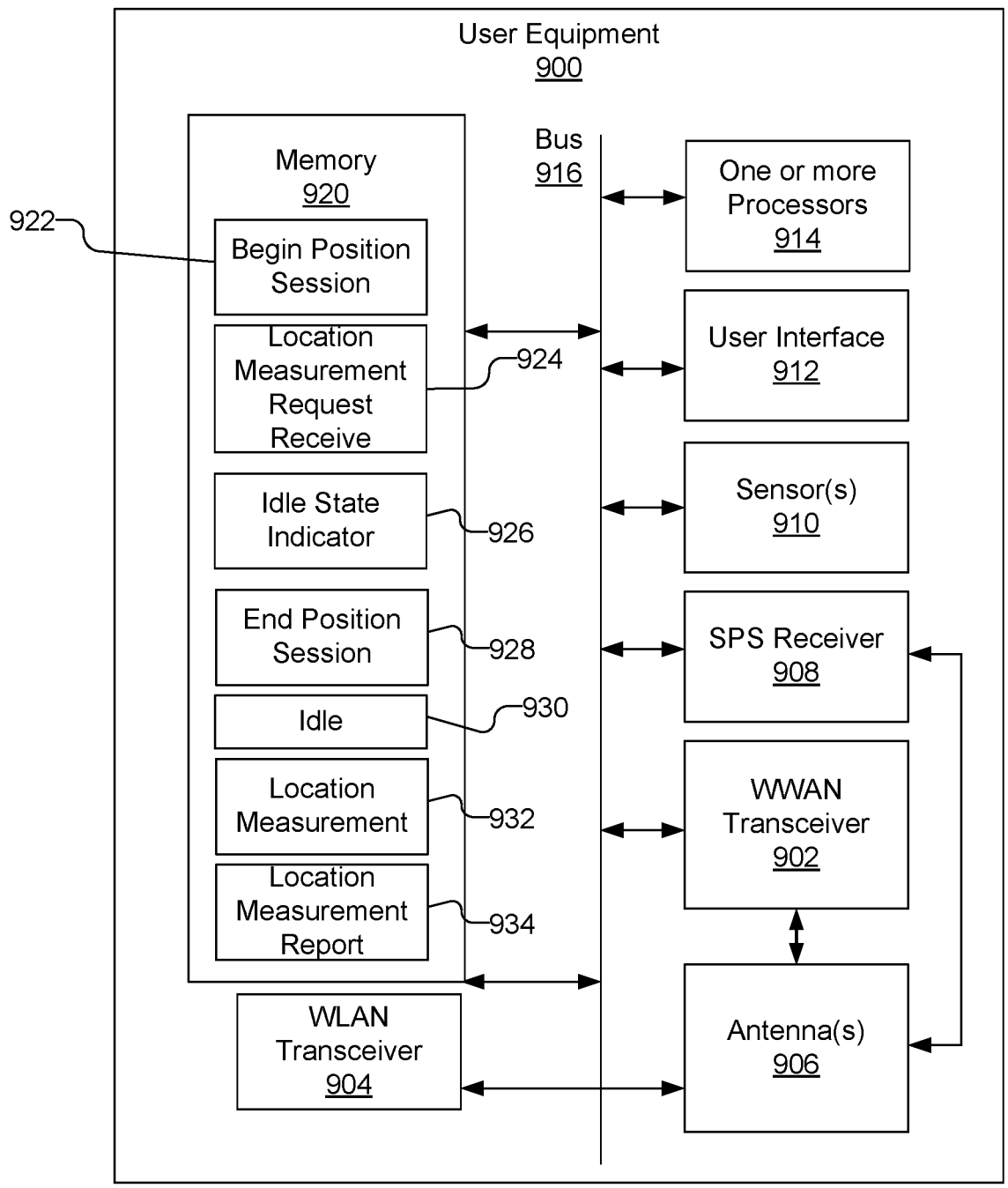
FIG. 9 is a diagram illustrating an example of a hardware implementation of UE configured for supporting location services as described herein.

FIG. 9 is a diagram illustrating an example of a hardware implementation of a user equipment (UE) 900, which may be the UE 105 shown in FIGS. 1-6. The UE 900 may include a WWAN transceiver 902 to wirelessly communicate with, e.g., cellular transceivers such as an eNB 110 (shown in FIG. 1) or a gNB 210 (shown in FIG. 2). The UE 900 may also include a WLAN transceiver 904 to wirelessly communicate with local transceivers (e.g. WiFi APs or BT beacons). The UE 900 may include one or more antennas 906 that may be used with the WWAN transceiver 902 and WLAN transceiver 904. The UE 900 may further include an SPS receiver 908 for receiving and measuring signals from SPS SVs 160 (shown in FIGS. 1 and 2), received via antenna(s) 906. The UE 900 may include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900.

The UE 900 further includes one or more processors 914 and memory 920, which may be coupled together with a bus 916. The one or more processors 914 and other components of the UE 900 may similarly be coupled together with bus 916, a separate bus, or may be directly connected together or coupled using a combination of the foregoing. The memory 920 may contain executable code or software (or firmware) instructions that when executed by the one or more processors 914 cause the one or more processors 914 to operate as a special purpose computer programmed to perform the techniques disclosed herein. As illustrated in FIG. 9, the memory 920 may include one or more components or modules that may be implemented by the one or more processors 914 to perform the methodologies described herein. While the components or modules are illustrated as software in memory 920 that is executable by the one or more processors 914, it should be understood that the components or modules may be dedicated hardware either in the one or more processors 914 or off the processors.

The memory 920 may include a begin position session unit 922 that when implemented by the one or more processors 914 configures the one or more processors 914 to engage in a user plane positioning session with a location server (e.g. SLP 130), e.g., including configuring the one or more processors 914 to send and/or receive messages (e.g. SUPL messages) via WWAN transceiver 902 and/or WLAN transceiver 904 to initiate the positioning session. A location measurement request receive unit 924, when implemented by the one or more processors 914, configures the one or more processors 914 to receive messages with a request for location measurements via WWAN transceiver 902 and/or WLAN transceiver 904. An idle state indicator unit 926, when implemented by the one or more processors 914, configures the one or more processors 914 to send a message (e.g. a SUPL message or a positioning protocol message) via WWAN transceiver 902 and/or WLAN transceiver 904 with an indication that the UE 900 will enter an idle state in which the UE 900 will not be connected with a wireless network. For example, the indication may be a parameter, flag, cause value, error cause value, LocationError value or Status Code value in the message. When implemented by the one or more processors 914, the idle state indicator unit 926 may cause the one or more processors 914 to provide an estimate of a time interval between a time of entering the idle state and a time of re-entering a connected state that may be sent in a positioning session.

An end position session unit 928, when implemented by the one or more processors 914, configures the one or more processors 914 to end the user plane positioning session with the location server, e.g., including configuring the one or more processors 914 to send and/or receive messages (e.g. SUPL messages) via WWAN transceiver 902 and/or WLAN transceiver 904 to end the positioning session.

The memory may further include an idle unit 930 that when implemented by the one or more processors 914 configures the one or more processors 914 to enter the idle state in which the UE 900 is not connected with a wireless network. When implemented by the one or more processors 914, the idle unit 930 may further cause the one or more processors 914 to re-enter a connected state with the wireless network after location measurements are obtained.

The memory 920 may further include a location measurement unit 932 that when implemented by the one or more processors 914 configures the one or more processors 914 to obtain location measurements, e.g., using one or more of the WWAN transceiver 902, WLAN transceiver 904 and SPS Receiver 908. For example, the location measurements may include at least one of a cell ID, RSSI, RSRP, RSRQ, RSTD, RTT, pseudorange, code phase or carrier phase measurement. When implemented by the one or more processors 914, the location measurement unit 932 may cause the location measurements to be obtained after the UE 900 is in an idle state. A location measurement report unit 934, when implemented by the one or more processors 914, configures the one or more processors 914 to send the location measurements obtained via the location measurement unit 932 to the location server, e.g., via WWAN transceiver 902 and/or WLAN transceiver 904, after the UE 900 has reentered a connected state.

The methodologies described herein may be implemented by various means depending upon the application. For example, these methodologies may be implemented in hardware, firmware, software, or any combination thereof. For a hardware implementation, the one or more processors 914 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 920) and executed by one or more processors 914, causing the one or more processors 914 to operate as a special purpose computer programmed to perform the techniques disclosed herein. Memory may be implemented within the one or processors 914 or external to the one or more processors 914. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as memory 920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable media, e.g., memory 920, and are configured to cause the one or more processors 914 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE 900 may include a means for beginning a first user plane location session with a location server, which may be, e.g., at least one wireless transceiver such as the WWAN transceiver 902 and/or WLAN transceiver 904 and one or more processors 914 with dedicated hardware or implementing executable code or software instructions in memory 920 such as the begin position session unit 922. A means for receiving a request for location measurements from the location server may be, e.g., at least one wireless transceiver such as the WWAN transceiver 902 and/or WLAN transceiver 904 and one or more processors 914 with dedicated hardware or implementing executable code or software instructions in memory 920 such as the location measurement request receive unit 924. A means for sending an indication to the location server that the UE 900 will enter an idle state in which the UE 900 will not be connected with a wireless network may be, e.g., at least one wireless transceiver such as the WWAN transceiver 902 and/or WLAN transceiver 904 and one or more processors 914 with dedicated hardware or implementing executable code or software instructions in memory 920 such as the idle state indicator unit 926. A means for ending the first user plane location session with the location server may be, e.g., at least one wireless transceiver such as the WWAN transceiver 902 and/or WLAN transceiver 904 and one or more processors 914 with dedicated hardware or implementing executable code or software instructions in memory 920 such as the end position session unit 928. A means for entering the idle state may be, e.g., one or more processors 914 with dedicated hardware or implementing executable code or software instructions in memory 920 such as the idle unit 930. A means for obtaining the location measurements while in the idle state may be, e.g., at least one wireless transceiver such as the WWAN transceiver 902 and/or WLAN transceiver 904 and/or SPS receiver 908 and one or more processors 914 with dedicated hardware or implementing executable code or software instructions in memory 920 such as the location measurement unit 932. A means for re-entering a connected state with the wireless network may be, e.g., at least one wireless transceiver such as the WWAN transceiver 902 and/or WLAN transceiver 904 and one or more processors 914 with dedicated hardware or implementing executable code or software instructions in memory 920 such as the idle unit 930. A means for beginning a second user plane location session with the location server may be, e.g., at least one wireless transceiver such as the WWAN transceiver 902 and/or WLAN transceiver 904 and one or more processors 914 with dedicated hardware or implementing executable code or software instructions in memory 920 such as the begin position session unit 922. A means for sending the location measurements to the location server using the second user plane location session may be, e.g., at least one wireless transceiver such as the WWAN transceiver 902 and/or WLAN transceiver 904 and one or more processors 914 with dedicated hardware or implementing executable code or software instructions in memory 920 such as the location measurement report unit 934.

Figure 10:
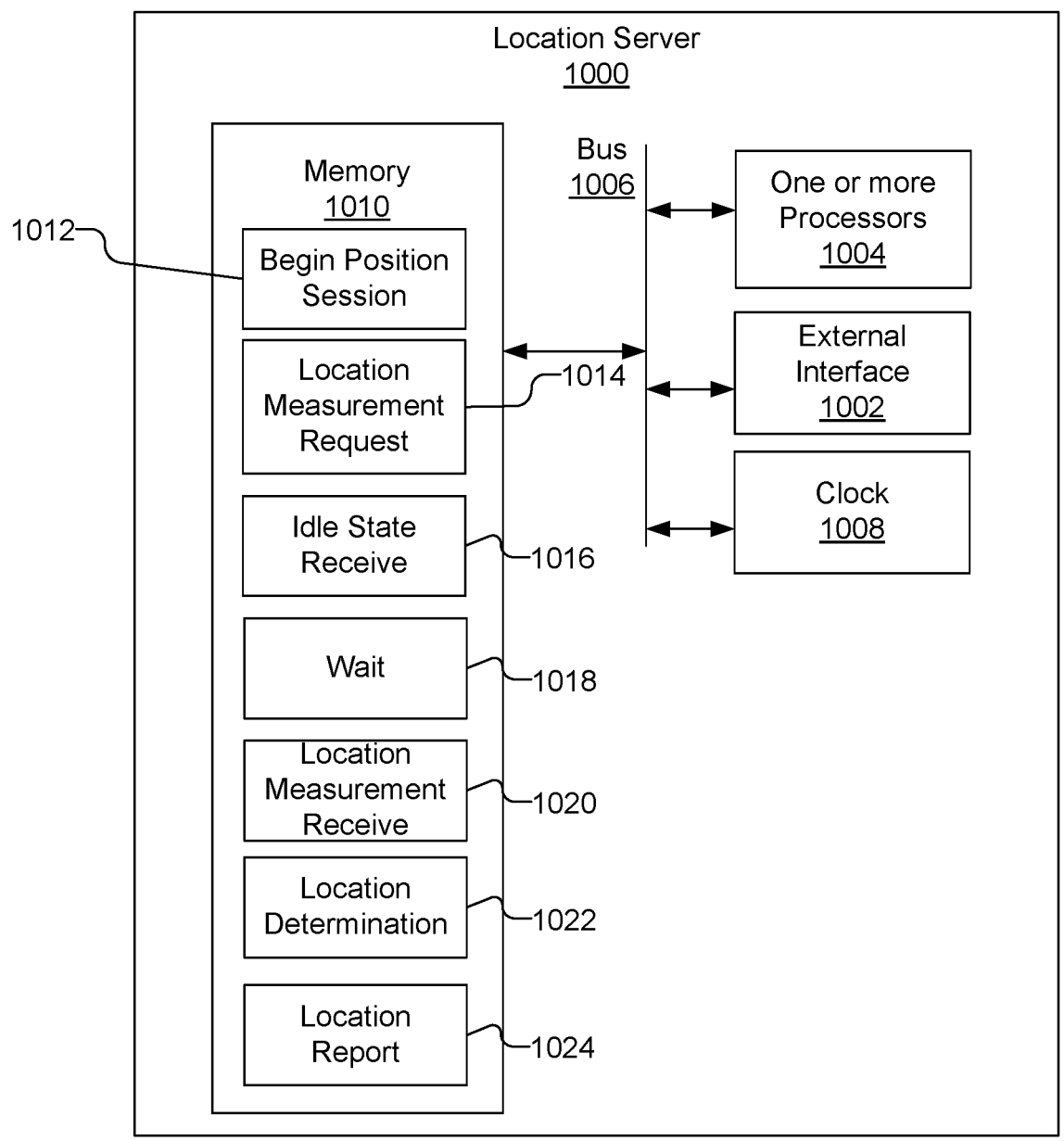
FIG. 10 is a diagram illustrating an example of a hardware implementation of a location server configured for supporting location services for a UE as described herein.

FIG. 10 is a diagram illustrating an example of a hardware implementation of a location server 1000, such as SLP 130, which may be, e.g., an H-SLP, E-SLP, or D-SLP, illustrated in FIGS. 1-6. The location server 1000 includes, e.g., hardware components such as an external interface 1002, which may be a wired or wireless interface capable of connecting to UE 105 directly or through one or more intermediary networks (e.g. E-UTRAN 112, NG-RAN 212, EPC 120 and/or 5GCN 250) and/or one or more network entities (e.g. eNB 110-1, SGW 126 and PDG 128 in FIG. 1 or gNB 210-1 and UPF 257 in FIG. 2). The location server 1000 may include a clock 1008 that may be used to determine a time period after a positioning session with the UE 105 has ended before a new position session with the UE 105 is initiated by the location server 1000. The location server 1000 includes one or more processors 1004 and memory 1010, which may be coupled together with a bus 1006. The memory 1010 may contain executable code or software (or firmware) instructions that when executed by the one or more processors 1004 cause the one or more processors 1004 to operate as a special purpose computer programmed to perform the techniques disclosed herein.

As illustrated in FIG. 10, the memory 1010 may include one or more components or modules that may be implemented by the one or more processors 1004 to perform the methodologies as described herein. While the components or modules are illustrated as software in memory 1010 that is executable by the one or more processors 1004, it should be understood that the components or modules may be dedicated hardware either in the one or more processors 1004 or off the processors. It should be understood that, since the location server 1000 can correspond to a number of different network entities, not all the functions and components for the location server 1000 described herein may be present for any particular example of the location server 1000.

For example, the memory 1010 may include a begin position session unit 1012 that when implemented by the one or more processors 1004 configures the one or more processors 1004 to engage in a user plane (e.g. SUPL) positioning session with a UE (e.g. UE 105) on behalf of an external client (e.g. external client 150), e.g., including configuring the one or more processors 1004 to send and/or receive messages (e.g. SUPL messages) via external interface 1002 to initiate the positioning session. A location measurement request unit 1014, when implemented by the one or more processors 1004, configures the one or more processors 1004 to send messages with a request for location measurements via the external interface 1002. An idle state receive unit 1016, when implemented by the one or more processors 1004, configures the one or more processors 1004 to receive messages with an indication that the UE will enter an idle state in which the UE will not be connected with a wireless network and during which the UE will obtain the location measurements.

The memory 1010 may further include a wait unit 1018 that when implemented by the one or more processors 1004 configures the one or more processors 1004 to wait a specific time period, determined by the clock 1008, after a positioning session with the UE has ended and before a new positioning session with the UE is begun, e.g., either initiated by the location server 1000 or by the UE. The time period to wait may be a configured parameter and may be, e.g., 30-120 seconds. In some implementations, the time period may be based on an estimate provided by the UE of a time interval between a time of entering the idle state at the UE and a time of re-entering a connected state at the UE. A location measurement receive unit 1020, when implemented by the one or more processors 1004, configures the one or more processors 1004 to receive location measurements from the UE via the external interface 1002.

The memory 1010 may further include a location determination unit 1022 that when implemented by the one or more processors 1004 configures the one or more processors 1004 to determine a location of the UE using the location measurements received from the UE. A location report unit 1024, when implemented by the one or more processors 1004, configures the one or more processors 1004 to send messages to the UE and/or external client with the location of the UE that is determined using the location measurements.

The methodologies described herein may be implemented by various means depending upon the application. For example, these methodologies may be implemented in location server 1000 using hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of location server 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the techniques disclosed herein. Memory may be implemented within the one or more processors 1004 or external to the one or processors 1004 (e.g. as memory 1010). As used herein the term "memory" refers to any type of long term, short term, volatile, nonvolatile, or other memory and is not to be limited to any particular type of memory or number of memories, or type of media upon which memory is stored.

If implemented in firmware and/or software in location server 1000, the functions described herein may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for location server 1000 may be provided as signals on transmission media included in a communication apparatus that may comprise part or all of location server 1000. For example, a communication apparatus may include a transceiver having signals indicative of instructions and data. The instructions and data are stored on non-transitory computer readable media, e.g., memory 1010, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server 1000 may include a means for beginning a first user plane location session with a UE, which may be, e.g., the external interface 1002 and one or more processors 1004 with dedicated hardware or implementing executable code or software instructions in memory 1010 such as the begin position session unit 1012. A means for sending a request for location measurements to the UE may be, e.g., the external interface 1002 and one or more processors 1004 with dedicated hardware or implementing executable code or software instructions in memory 1010 such as the location measurement request unit 1014. A means for receiving an indication from the UE that the UE will enter an idle state in which the UE will not be connected with a wireless network and during which the UE will obtain the location measurements may be, e.g., the external interface 1002 and one or more processors 1004 with dedicated hardware or implementing executable code or software instructions in memory 1010 such as the idle state receive unit 1016. A means for ending the first user plane location session with the UE may be, e.g., the external interface 1002 and one or more processors 1004 with dedicated hardware or implementing executable code or software instructions in memory 1010 such as the wait unit 1018. A means for beginning a second user plane location session with the UE may be, e.g., the external interface 1002 and one or more processors 1004 with dedicated hardware or implementing executable code or software instructions in memory 1010 such as the begin position session unit 1012. A means for receiving the location measurements from the UE using the second user plane location session may be, e.g., the external interface 1002 and one or more processors 1004 with dedicated hardware or implementing executable code or software instructions in memory 1010 such as the location measurement receive unit 1020. A means for determining the location of the UE using the location measurements may be, e.g., the external interface 1002 and one or more processors 1004 with dedicated hardware or implementing executable code or software instructions in memory 1010 such as the location determination unit 1022.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method for supporting location services for a user equipment (UE) performed by a location server, comprising: beginning a first user plane location session with the UE; sending a request for location measurements to the UE; receiving an indication from the UE that the UE will enter an idle state in which the UE will not be connected with a wireless network and during which the UE will obtain the location measurements; ending the first user plane location session with the UE; beginning a second user plane location session with the UE; receiving the location measurements from the UE using the second user plane location session; and determining the location of the UE using the location measurements.

There may be some implementations (2) of the above described method (1), wherein beginning the first user plane location session with the UE comprises sending a first message to the UE or receiving a second message from the UE, wherein beginning the second user plane location session with the UE comprises sending a third message to the UE or receiving a fourth message from the UE, wherein the first message and the third message comprise a first message type and the second message and the fourth message comprise a second message type.

There may be some implementations (3) of the above described method (2), wherein the first message type is a Secure User Plane Location (SUPL) INIT message type and the second message type is a SUPL START message type.

There may be some implementations (4) of the above described method (1), wherein ending the first user plane location session with the UE comprises sending a fifth message to the UE or receiving a sixth message from the UE.

There may be some implementations (5) of the above described method (4), wherein the fifth message and the sixth message are each a Secure User Plane Location (SUPL) END message.

There may be some implementations (6) of the above described method (4), wherein the indication that the UE will enter the idle state comprises a parameter, flag, cause value, error cause value, LocationError value or Status Code value in a seventh message received from the UE.

There may be some implementations (7) of the above described method (6), wherein the indication that the UE will enter the idle state further comprises an estimate of a time interval between a time of entering the idle state at the UE and a time of re-entering a connected state at the UE.

There may be some implementations (8) of the above described method (6), wherein the seventh message comprises the sixth message or a positioning protocol message.

There may be some implementations (9) of the above described method (8), wherein the positioning protocol message comprises a Long Term Evolution (LTE) Positioning Protocol (LPP) Provide Location Information (PLI) message, wherein the LPP PLI message is received by the location server in a Secure User Plane Location (SUPL) POS message.

There may be some implementations (10) of the above described method (2), further comprising: receiving the second message, wherein the second message comprises a first application identification (ID); receiving the fourth message, wherein the fourth message comprises a second application ID; verifying the first application ID is the same as the second application ID; and determining the location of the UE using the location measurements, based on the verification.

There may be some implementations (11) of the above described method (2), further comprising: sending the first message, wherein the first message comprises a notification; and sending the third message, wherein the third message comprises the notification.

There may be some implementations (12) of the above described method (2), further comprising: receiving the fourth message, wherein the fourth message comprises a new session identification (ID); verifying the new session ID is associated with an initial session ID for the first user plane location session; and determining the location of the UE using the location measurements, based on the verification.

There may be some implementations (13) of the above described method (2), further comprising: sending the third message, wherein the third message comprises a new session identification (ID), wherein the new session ID is associated with an initial session ID for the first user plane location session.

There may be some implementations (14) of the above described method (1), further comprising sending the location of the UE to an external client.

There may be some implementations (15) of the above described method (1), further comprising sending the location of the UE to the UE.

There may be some implementations (16) of the above described method (1), wherein the user equipment (UE) is connected to the wireless network using Narrowband Internet of Things (NB-IoT) radio access or a narrowband New Radio (NR) radio access.

One implementation (17) may be a location server for supporting location services for a user equipment (UE), comprising: an external interface configured to communicate with a wireless network; and at least one processor coupled to the external interface and configured to begin via the external interface a first user plane location session with the UE, send via the external interface a request for location measurements to the UE, receive via the external interface an indication from the UE that the UE will enter an idle state in which the UE will not be connected with the wireless network and during which the UE will obtain the location measurements, end via the external interface the first user plane location session with the UE, begin via the external interface a second user plane location session with the UE, receive via the external interface the location measurements from the UE using the second user plane location session, and determine the location of the UE using the location measurements.

There may be some implementations (18) of the above described location server (17), wherein the at least one processor is configured to begin via the external interface the first user plane location session with the UE by being configured to send via the external interface a first message to the UE or receive via the external interface a second message from the UE, wherein the at least one processor is configured to begin via the external interface the second user plane location session with the UE by being configured to send via the external interface a third message to the UE or receive via the external interface a fourth message from the UE, wherein the first message and the third message comprise a first message type and the second message and the fourth message comprise a second message type.

There may be some implementations (19) of the above described location server (18), wherein the first message type is a Secure User Plane Location (SUPL) INIT message type and the second message type is a SUPL START message type.

There may be some implementations (20) of the above described location server (17), wherein the at least one processor is configured to end via the external interface the first user plane location session with the UE by being configure to send via the external interface a fifth message to the UE or receive via the external interface a sixth message from the UE.

There may be some implementations (21) of the above described location server (20), wherein the fifth message and the sixth message are each a Secure User Plane Location (SUPL) END message.

There may be some implementations (22) of the above described location server (20), wherein the indication that the UE will enter the idle state comprises a parameter, flag, cause value, error cause value, LocationError value or Status Code value in a seventh message received from the UE.

There may be some implementations (23) of the above described location server (22), wherein the indication that the UE will enter the idle state further comprises an estimate of a time interval between a time of entering the idle state at the UE and a time of re-entering a connected state at the UE.

There may be some implementations (24) of the above described location server (22), wherein the seventh message comprises the sixth message or a positioning protocol message.

There may be some implementations (25) of the above described location server (24), wherein the positioning protocol message comprises a Long Term Evolution (LTE) Positioning Protocol (LPP) Provide Location Information (PLI) message, wherein the LPP PLI message is received by the location server in a Secure User Plane Location (SUPL) POS message.

There may be some implementations (26) of the above described location server (18), the at least one processor is further configured to: receive via the external interface the second message, wherein the second message comprises a first application identification (ID); receive via the external interface the fourth message, wherein the fourth message comprises a second application ID; verify the first application ID is the same as the second application ID; and determine the location of the UE using the location measurements, based on the verification.

There may be some implementations (27) of the above described location server (18), the at least one processor is further configured to: send via the external interface the first message, wherein the first message comprises a notification; and send via the external interface the third message, wherein the third message comprises the notification.

There may be some implementations (28) of the above described location server (18), the at least one processor is further configured to: receive via the external interface the fourth message, wherein the fourth message comprises a new session identification (ID); verify the new session ID is associated with an initial session ID for the first user plane location session; and determine the location of the UE using the location measurements, based on the verification.

There may be some implementations (29) of the above described location server (18), the at least one processor is further configured to: send via the external interface the third message, wherein the third message comprises a new session identification (ID), wherein the new session ID is associated with an initial session ID for the first user plane location session.

There may be some implementations (30) of the above described location server (17), the at least one processor is further configured to send via the external interface the location of the UE to an external client.

There may be some implementations (31) of the above described location server (17), the at least one processor is further configured to send via the external interface the location of the UE to the UE.

There may be some implementations (32) of the above described location server (17), wherein the user equipment (UE) is connected to the wireless network using Narrowband Internet of Things (NB-IoT) radio access or a narrowband New Radio (NR) radio access.

One implementation (33) may be a location server for supporting location services for a user equipment (UE), comprising: means for beginning a first user plane location session with the UE; means for sending a request for location measurements to the UE; means for receiving an indication from the UE that the UE will enter an idle state in which the UE will not be connected with a wireless network and during which the UE will obtain the location measurements; means for ending the first user plane location session with the UE; means for beginning a second user plane location session with the UE; means for receiving the location measurements from the UE using the second user plane location session; and means for determining the location of the UE using the location measurements.

One implementation (33) may be a non-transitory storage medium including program code stored thereon, the program code is operable to cause at least one processor in a location server capable of supporting location services for a user equipment (UE) to: begin a first user plane location session with the UE; send a request for location measurements to the UE; receive an indication from the UE that the UE will enter an idle state in which the UE will not be connected with a wireless network and during which the UE will obtain the location measurements; end the first user plane location session with the UE; begin a second user plane location session with the UE; receive the location measurements from the UE using the second user plane location session; and determine the location of the UE using the location measurements.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) performed by the UE, comprising:
   beginning a first user plane location session with a location server;
   receiving a non-periodic request for location measurements from the location server;
   sending an indication to the location server that the UE will enter an idle state in which the UE will not be connected with a wireless network;
   prior to measuring the location measurements, ending the first user plane location session with the location server;
   entering the idle state;
   obtaining the location measurements while in the idle state;
   re-entering a connected state with the wireless network;
   beginning a second user plane location session with the location server; and
   sending the location measurements to the location server using the second user plane location session.

2. The method of claim 1, wherein beginning the first user plane location session with the location server comprises sending a first message to the location server or receiving a second message from the location server, wherein beginning the second user plane location session with the location server comprises sending a third message to the location server or receiving a fourth message from the location server, wherein the first message and the third message comprise a first message type and the second message and the fourth message comprise a second message type.

3. The method of claim 2, wherein the first message type is a Secure User Plane Location (SUPL) START message type and the second message type is a SUPL INIT message type.

4. The method of claim 1, wherein ending the first user plane location session with the location server comprises sending a fifth message to the location server or receiving a sixth message from the location server.

5. The method of claim 4, wherein the fifth message and the sixth message are each a Secure User Plane Location (SUPL) END message.

6. The method of claim 4, wherein the indication that the UE will enter the idle state comprises a parameter, flag, cause value, error cause value, LocationError value or Status Code value in a seventh message sent to the location server.

7. The method of claim 6, wherein the indication that the UE will enter the idle state further comprises an estimate of a time interval between a time of entering the idle state and a time of re-entering the connected state.

8. The method of claim 6, wherein the seventh message comprises the fifth message or a positioning protocol message.

9. The method of claim 8, wherein the positioning protocol message comprises a Long Term Evolution (LTE) Positioning Protocol (LPP) Provide Location Information (PLI) message, wherein the LPP PLI message is sent to the location server in a Secure User Plane Location (SUPL) POS message.

10. The method of claim 2, further comprising:
    receiving the second message, wherein the second message comprises a first notification parameter;
    receiving the fourth message, wherein the fourth message comprises a second notification parameter;
    verifying the first notification parameter is the same as the second notification parameter; and
    sending the location measurements to the location server using the second user plane location session, based on the verification.

11. The method of claim 2, further comprising:
    sending the first message, wherein the first message comprises an application identification (ID); and
    sending the third message, wherein the third message comprises the application ID.

12. The method of claim 2, further comprising:
    receiving the fourth message, wherein the fourth message comprises a new session identification (ID);
    verifying the new session ID is associated with an initial session ID for the first user plane location session; and
    sending the location measurements to the location server using the second user plane location session, based on the verification.

13. The method of claim 2, further comprising:
    sending the third message, wherein the third message comprises a new session identification (ID), wherein the new session ID is associated with an initial session ID for the first user plane location session.

14. The method of claim 1, wherein the user equipment (UE) is connected to the wireless network using Narrowband Internet of Things (NB-IoT) radio access or a narrowband New Radio (NR) radio access.

15. A user equipment (UE) capable of supporting location services, comprising:
    at least one wireless transceiver configured to wirelessly communicate with a wireless network; and
    at least one processor coupled to the at least one wireless transceiver and configured to:
    begin via the at least one wireless transceiver a first user plane location session with a location server;
    receive via the at least one wireless transceiver a non-periodic request for location measurements from the location server;
    send via the at least one wireless transceiver an indication to the location server that the UE will enter an idle state in which the UE will not be connected with the wireless network;
    prior to measuring the location measurements, end via the at least one wireless transceiver the first user plane location session with the location server;
    enter the idle state;
    obtain via the at least one wireless transceiver the location measurements while in the idle state;
    re-enter a connected state with the wireless network;
    begin via the at least one wireless transceiver a second user plane location session with the location server; and
    send via the at least one wireless transceiver the location measurements to the location server using the second user plane location session.

16. The UE of claim 15, wherein the at least one processor is configured to begin via the at least one wireless transceiver the first user plane location session with the location server by being configured to send via the at least one wireless transceiver a first message to the location server or receive via the at least one wireless transceiver a second message from the location server, wherein the at least one processor is configured to begin via the at least one wireless transceiver the second user plane location session with the location server by being configured to send via the at least one wireless transceiver a third message to the location server or receive via the at least one wireless transceiver a fourth message from the location server, wherein the first message and the third message comprise a first message type and the second message and the fourth message comprise a second message type.

17. The UE of claim 16, wherein the first message type is a Secure User Plane Location (SUPL) START message type and the second message type is a SUPL INIT message type.

18. The UE of claim 15, wherein the at least one processor is configured to end via the at least one wireless transceiver the first user plane location session with the location server by being configured to send via the at least one wireless transceiver a fifth message to the location server or receive via the at least one wireless transceiver a sixth message from the location server.

19. The UE of claim 18, wherein the fifth message and the sixth message are each a Secure User Plane Location (SUPL) END message.

20. The UE of claim 18, wherein the indication that the UE will enter the idle state comprises a parameter, flag, cause value, error cause value, LocationError value or Status Code value in a seventh message sent to the location server.

21. The UE of claim 20, wherein the indication that the UE will enter the idle state further comprises an estimate of a time interval between a time of entering the idle state and a time of re-entering the connected state.

22. The UE of claim 20, wherein the seventh message comprises the fifth message or a positioning protocol message.

23. The UE of claim 22, wherein the positioning protocol message comprises a Long Term Evolution (LTE) Positioning Protocol (LPP) Provide Location Information (PLI) message, wherein the LPP PLI message is sent to the location server in a Secure User Plane Location (SUPL) POS message.

24. The UE of claim 16, the at least one processor is further configured to:
receive via the at least one wireless transceiver the second message, wherein the second message comprises a first notification parameter;
receive via the at least one wireless transceiver the fourth message, wherein the fourth message comprises a second notification parameter;
verify the first notification parameter is the same as the second notification parameter; and
send via the at least one wireless transceiver the location measurements to the location server using the second user plane location session, based on the verification.

25. The UE of claim 16, the at least one processor is further configured to:
send via the at least one wireless transceiver the first message, wherein the first message comprises an application identification (ID); and
send via the at least one wireless transceiver the third message, wherein the third message comprises the application ID.

26. The UE of claim 16, the at least one processor is further configured to:
receive via the at least one wireless transceiver the fourth message, wherein the fourth message comprises a new session identification (ID);
verify the new session ID is associated with an initial session ID for the first user plane location session; and
send via the at least one wireless transceiver the location measurements to the location server using the second user plane location session, based on the verification.

27. The UE of claim 16, the at least one processor is further configured to:
send via the at least one wireless transceiver the third message, wherein the third message comprises a new session identification (ID), wherein the new session ID is associated with an initial session ID for the first user plane location session.

28. The UE of claim 15, wherein the UE is connected to the wireless network using Narrowband Internet of Things (NB-IoT) radio access or a narrowband New Radio (NR) radio access.

29. A user equipment (UE) capable of supporting location services, comprising:
means for beginning a first user plane location session with a location server;
means for receiving a non-periodic request for location measurements from the location server;
means for sending an indication to the location server that the UE will enter an idle state in which the UE will not be connected with a wireless network;
means for, prior to measuring the location measurements, ending the first user plane location session with the location server;
means for entering the idle state;
means for obtaining the location measurements while in the idle state;
means for re-entering a connected state with the wireless network;
means for beginning a second user plane location session with the location server; and
means for sending the location measurements to the location server using the second user plane location session.

30. A non-transitory storage medium including program code stored thereon, the program code is operable to cause at least one processor in a user equipment (UE) capable of supporting location services to:
begin a first user plane location session with a location server;
receive a non-periodic request for location measurements from the location server;
send an indication to the location server that the UE will enter an idle state in which the UE will not be connected with a wireless network;
prior to measuring the location measurements, end the first user plane location session with the location server;
enter the idle state;
obtain the location measurements while in the idle state;
re-enter a connected state with the wireless network;
begin a second user plane location session with the location server; and
send the location measurements to the location server using the second user plane location session.

* * * * *